United States Patent
Mizusawa

(10) Patent No.: US 9,538,548 B2
(45) Date of Patent: Jan. 3, 2017

(54) COMMUNICATION CONTROL APPARATUS, TERMINAL APPARATUS, AND COMMUNICATION CONTROL METHOD

(71) Applicant: Sony Corporation, Tokyo (JP)

(72) Inventor: Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/418,949

(22) PCT Filed: May 29, 2013

(86) PCT No.: PCT/JP2013/064907
§ 371 (c)(1),
(2) Date: Feb. 1, 2015

(87) PCT Pub. No.: WO2014/027495
PCT Pub. Date: Feb. 20, 2014

(65) Prior Publication Data
US 2015/0215962 A1    Jul. 30, 2015

(30) Foreign Application Priority Data
Aug. 13, 2012   (JP) ................. 2012-179279

(51) Int. Cl.
H04W 72/12     (2009.01)
H04W 72/14     (2009.01)
(Continued)

(52) U.S. Cl.
CPC ......... *H04W 72/1273* (2013.01); *H04W 16/16* (2013.01); *H04W 72/04* (2013.01);
(Continued)

(58) Field of Classification Search
CPC ...... H04W 16/16; H04W 72/04; H04W 72/14; H04W 72/1215; H04W 72/1273; H04W 92/20; H04W 36/14
See application file for complete search history.

(56) References Cited

U.S. PATENT DOCUMENTS 8,543,120 B2   9/2013  Mizusawa
8,934,367 B2   1/2015  Mizusawa et al.
(Continued)

FOREIGN PATENT DOCUMENTS

JP   2009-267678      11/2009
JP   2010-516092 A    5/2010
(Continued)

OTHER PUBLICATIONS

No Author Listed, Impact of time domain eICIC on uplink interference. 3GPP TSG RAN WG1 Meeting #62. Aug. 23-27, 2010. 4 pages.
(Continued)

*Primary Examiner* — Brian D Nguyen
(74) *Attorney, Agent, or Firm* — Wolf, Greenfield & Sacks, P.C.

(57) ABSTRACT

Provided is a communication control apparatus including a communication unit configured to receive, from a base station of a first radio communication system, grant information that specifies a resource for secondary use within a frequency resource assigned to the first radio communication system operated with a frequency division duplex scheme, and a communication control unit configured to operate a second radio communication system with a time division duplex scheme on the resource for secondary use during a period that is associated with the grant information.

10 Claims, 18 Drawing Sheets

(51) Int. Cl.
*H04W 72/04* (2009.01)
*H04W 16/16* (2009.01)
*H04W 92/20* (2009.01)
*H04W 36/14* (2009.01)

(52) U.S. Cl.
CPC ....... *H04W 72/1215* (2013.01); *H04W 72/14* (2013.01); *H04W 36/14* (2013.01); *H04W 92/20* (2013.01)

(56) References Cited

U.S. PATENT DOCUMENTS

| | | | |
|---|---|---|---|
| 2008/0165709 A1 | 7/2008 | Soliman | |
| 2009/0296641 A1* | 12/2009 | Bienas | H04W 24/02 370/329 |
| 2010/0197235 A1 | 8/2010 | Wilhelmsson | |
| 2010/0222062 A1* | 9/2010 | Chou | H04W 16/14 455/449 |
| 2011/0149764 A1 | 6/2011 | Wietfeldt et al. | |
| 2011/0243047 A1 | 10/2011 | Dayal et al. | |
| 2011/0243094 A1 | 10/2011 | Dayal et al. | |
| 2011/0244866 A1* | 10/2011 | Yamamoto | H04W 36/22 455/438 |
| 2011/0244871 A1 | 10/2011 | Mizusawa | |
| 2011/0256834 A1 | 10/2011 | Dayal et al. | |
| 2012/0020229 A1 | 1/2012 | Dayal et al. | |
| 2012/0033645 A1 | 2/2012 | Mantravadi et al. | |
| 2012/0034913 A1 | 2/2012 | Wang et al. | |
| 2012/0087341 A1 | 4/2012 | Jang et al. | |
| 2012/0093009 A1 | 4/2012 | Wang et al. | |
| 2012/0113812 A1 | 5/2012 | Ji et al. | |
| 2012/0115469 A1 | 5/2012 | Chen et al. | |
| 2012/0122467 A1* | 5/2012 | Auer | H04W 16/10 455/452.1 |
| 2012/0129457 A1 | 5/2012 | Linsky | |
| 2012/0129522 A1* | 5/2012 | Kim | H04W 72/0426 455/434 |
| 2012/0135743 A1* | 5/2012 | Ebiko | H04W 72/082 455/452.2 |
| 2012/0164948 A1 | 6/2012 | Narasimha et al. | |
| 2012/0230267 A1* | 9/2012 | Sundaresan | H04W 72/06 370/329 |
| 2012/0238273 A1* | 9/2012 | Lim | H04W 16/04 455/436 |
| 2012/0264445 A1* | 10/2012 | Lee | H04W 28/048 455/452.1 |
| 2012/0307780 A1 | 12/2012 | Mochizuki et al. | |
| 2012/0327869 A1 | 12/2012 | Wang et al. | |
| 2013/0003671 A1 | 1/2013 | Wang et al. | |
| 2013/0016635 A1 | 1/2013 | Linsky et al. | |
| 2013/0034001 A1 | 2/2013 | Mizusawa et al. | |
| 2013/0039284 A1* | 2/2013 | Marinier | H04L 5/001 370/329 |
| 2013/0064111 A1 | 3/2013 | Linsky et al. | |
| 2013/0070653 A1 | 3/2013 | Banister et al. | |
| 2013/0223391 A1 | 8/2013 | Koo et al. | |
| 2013/0242919 A1 | 9/2013 | Koo et al. | |
| 2013/0273857 A1 | 10/2013 | Zhang et al. | |
| 2013/0329681 A1 | 12/2013 | Sebire | |
| 2013/0337815 A1 | 12/2013 | Sebire | |
| 2014/0031036 A1 | 1/2014 | Koo et al. | |
| 2014/0038631 A1* | 2/2014 | Kruglick | H04W 72/0426 455/452.2 |
| 2014/0302867 A1 | 10/2014 | Mizusawa | |
| 2015/0117348 A1 | 4/2015 | Takano et al. | |
| 2015/0156006 A1 | 6/2015 | Takano et al. | |
| 2016/0080135 A1 | 3/2016 | Takano et al. | |

FOREIGN PATENT DOCUMENTS

| | | |
|---|---|---|
| JP | 2012-129793 A | 7/2012 |
| WO | WO 2011/099511 A1 | 8/2011 |

OTHER PUBLICATIONS

3GPP TS 36.101 V10.0.0 (Dec. 2010). Technical Specification. 3rd Generation Partnership Project; Technical Specification Group Radio Access Network; Evolved Universal Terrestrial Radio Access (E-UTRA); User Equipment (UE) radio transmission and reception (Release 10), Oct. 2010.
U.S. Appl. No. 13/053,554, filed Mar. 22, 2011, Mizusawa.
U.S. Appl. No. 13/550,857, filed Jul. 17, 2012, Mizusawa et al.
U.S. Appl. No. 14/358,279, filed May 15, 2014, Mizusawa.
U.S. Appl. No. 14/397,906, filed Oct. 30, 2014, Takano et al.
U.S. Appl. No. 14/409,628, filed Dec. 19, 2014, Takano et al.
U.S. Appl. No. 14/946,694, filed Nov. 19, 2015, Takano et al.

* cited by examiner

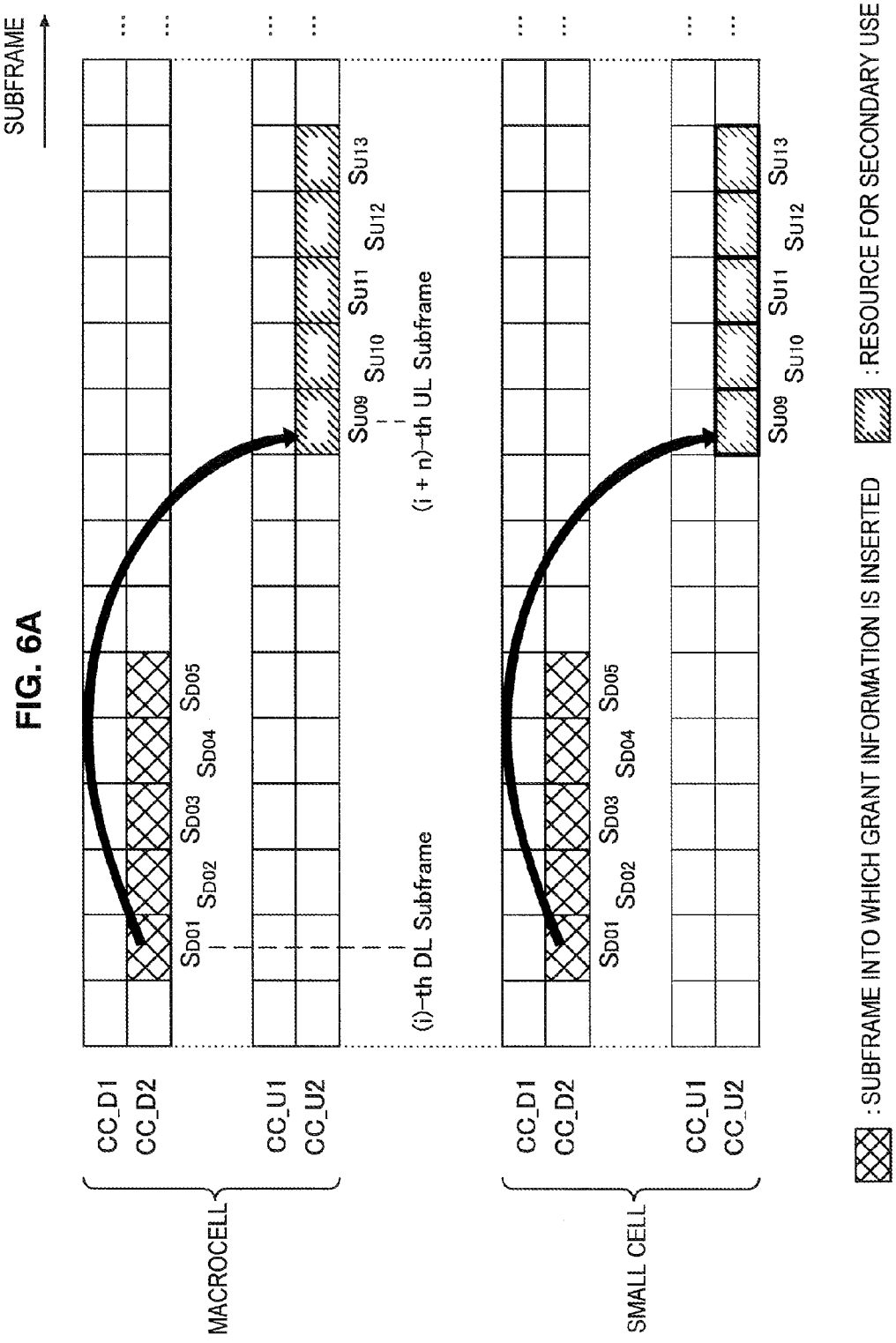

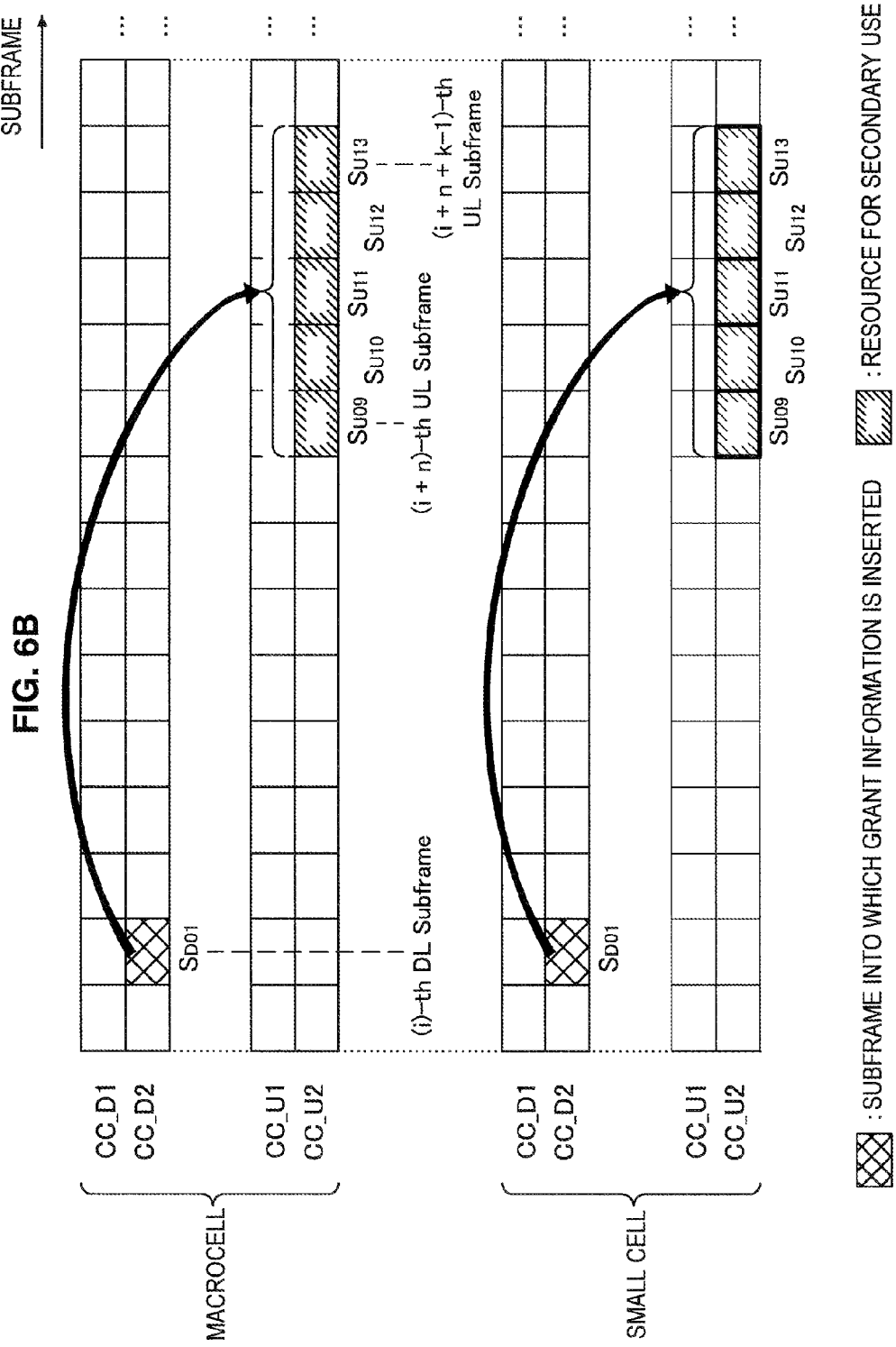

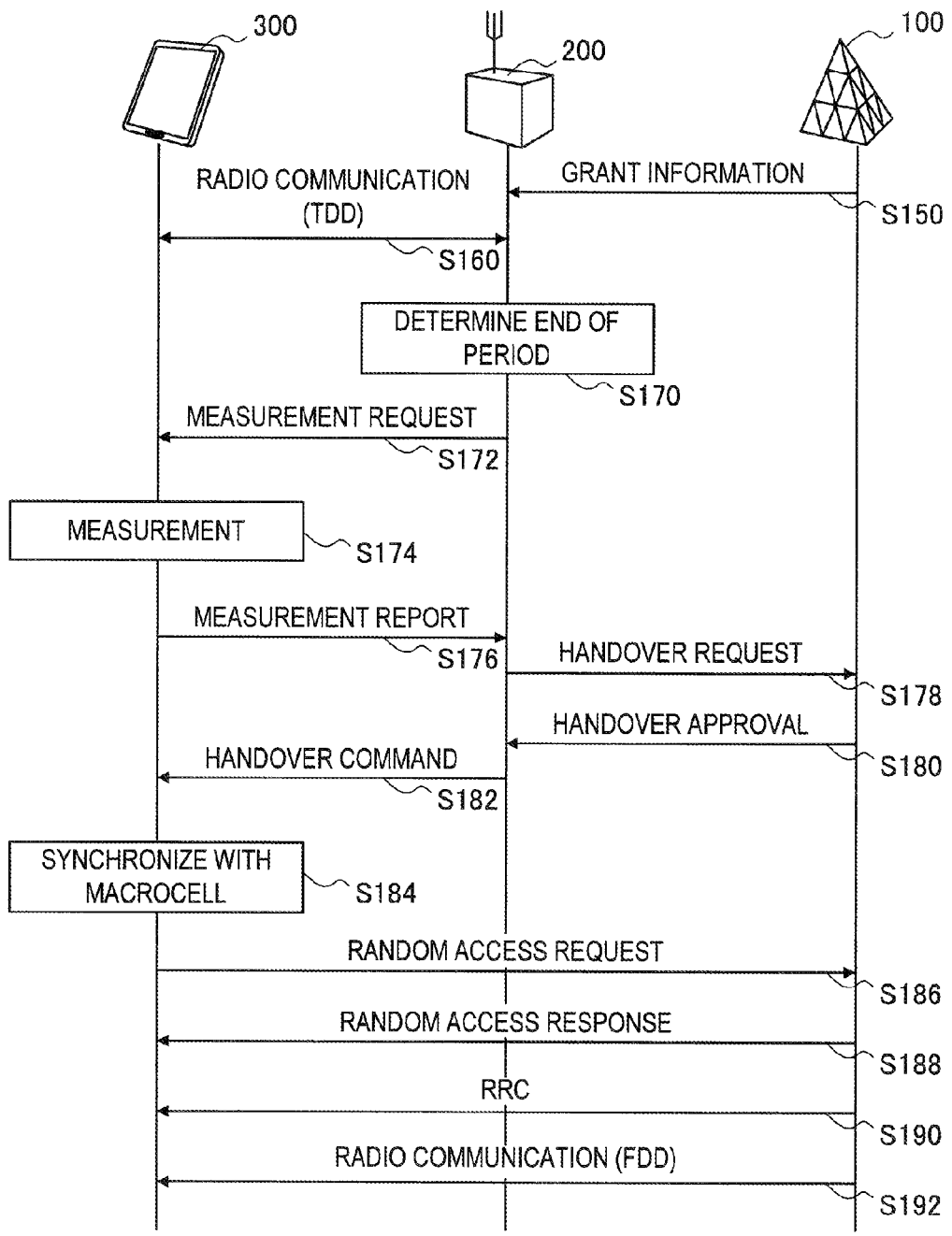

COMMUNICATION CONTROL APPARATUS, TERMINAL APPARATUS, AND COMMUNICATION CONTROL METHOD

CROSS REFERENCE TO RELATED APPLICATIONS

This is a U.S. National Stage Application under 35 U.S.C. §371, based on International Application No. PCT/JP2013/064907, filed May 29, 2013, which claims priority to Japanese Patent Application JP 2012-179279, filed Aug. 13, 2012, each of which is hereby incorporated by reference in its entirety.

TECHNICAL FIELD

The present invention relates to a communication control apparatus, a terminal apparatus, and a communication control method.

BACKGROUND ART

The radio communication technology is faced by a problem of a lack of frequency resources due to recent rapid increase in data traffic. One of examples of major solutions to use frequency resources efficiently is to introduce a relay station. A relay station relays traffic for a terminal located inside a cell or in the vicinity thereof where radio waves are weak (e.g., behind a building, inside a building, or near a cell edge). Another example of major solutions to use frequency resources efficiently is to introduce a small cell. A small cell is a concept encompassing femtocells, nanocells, picocells, microcells, and the like. A station of a small cell is installed at a position where radio waves are weak or the traffic amount is large and operates a radio communication system of a small cell.

To introduce a small cell, it is required that a macrocell is not interfered harmfully. One of techniques to prevent interference with a macrocell is to divide frequencies. That is, a base station of a small cell uses a frequency channel that is different from a frequency channel used in s macrocell, and thereby it becomes possible to suppress an interference level given by the base station of a small cell or a terminal thereof to a base station of a macrocell or a terminal thereof.

Patent Literature 1 below proposes a technique in which a base station of a picocell secondarily uses a part of a frequency channel protected for a macrocell in a situation that the macrocell is operated with a frequency division duplex (FDD) scheme. The base station of the picocell operates a radio communication system of a small cell with a time division duplex (TDD) scheme.

CITATION LIST

Patent Literature

Patent Literature 1: JP 2010-516092T

SUMMARY OF INVENTION

Technical Problem

However, the technique disclosed in Patent Literature 1 above fixedly sets a frequency channel that the picocell should use. Meanwhile, the amount of data traffic always changes. Accordingly, the technique disclosed in Patent Literature 1 inevitably causes a vacant resource or a lack of resource in a macrocell or a small cell, as a result of the change in the amount of traffic.

Therefore, the existing technique needs to be improved in terms of usage efficiency of a frequency resource.

Solution to Problem

According to the present disclosure, there is provided a communication control apparatus including a communication unit configured to receive, from a base station of a first radio communication system, grant information that specifies a resource for secondary use within a frequency resource assigned to the first radio communication system operated with a frequency division duplex scheme, and a communication control unit configured to operate a second radio communication system with a time division duplex scheme on the resource for secondary use during a period that is associated with the grant information.

Further, according to the present disclosure, there is provided a communication control apparatus including a communication control unit configured to operate, on a frequency resource assigned to a first radio communication system, the first radio communication system with a frequency division duplex scheme, a secondary use control unit configured to decide a resource for secondary use within the frequency resource, and to generate grant information that is associated with a period during which secondary use is granted, and a communication unit configured to transmit the generated grant information.

Further, according to the present disclosure, there is provided a terminal apparatus including a communication unit configured to receive, from a base station of a first radio communication system, grant information that specifies a resource for secondary use within a frequency resource assigned to the first radio communication system operated with a frequency division duplex scheme, and a communication control unit configured to search for a second radio communication system operated with a time division duplex scheme on the resource for secondary use during a period that is associated with the grant information.

Further, according to the present disclosure, there is provided a communication control method including deciding, in a first communication control apparatus that operates a first radio communication system with a frequency division duplex scheme on a frequency resource assigned to the first radio communication system, a resource for secondary use within the frequency resource, transmitting grant information that specifies the decided resource for secondary use from the first communication control apparatus to a second communication control apparatus, and operating, by the second communication control apparatus, a second radio communication system with a time division duplex scheme on the resource for secondary use during a period that is associated with the grant information.

Advantageous Effects of Invention

According to the technique of the present disclosure, the usage efficiency of a frequency resource can be improved to introduce small cells.

BRIEF DESCRIPTION OF DRAWINGS

FIG. 6A is an explanatory diagram showing a first example of grant information transmitted from a macrocell base station.

FIG. 6B is an explanatory diagram showing a second example of grant information transmitted from a macrocell base station.

FIG. 17 is a sequence diagram showing an example of a flow of communication control processing when a secondary use period ends.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference indicators, and repeated explanation is omitted.

The description will be made in the following order.
1. Outline of technology according to present disclosure
   1-1. Outline of system
   1-2. Configuration example of resource
   1-3. Description of problems
2. Configuration of macrocell base station
   2-1. Configuration example of apparatus
   2-2. Example of flow of processing
3. Configuration of small cell base station
   3-1. Configuration example of apparatus
   3-2. Example of flow of processing
4. Configuration of terminal
   4-1. Configuration example of apparatus
   4-2. Example of flow of processing
5. Conclusion <1. Outline of Technology According to Present Disclosure>
[1-1. Outline of System]

Figure 1:
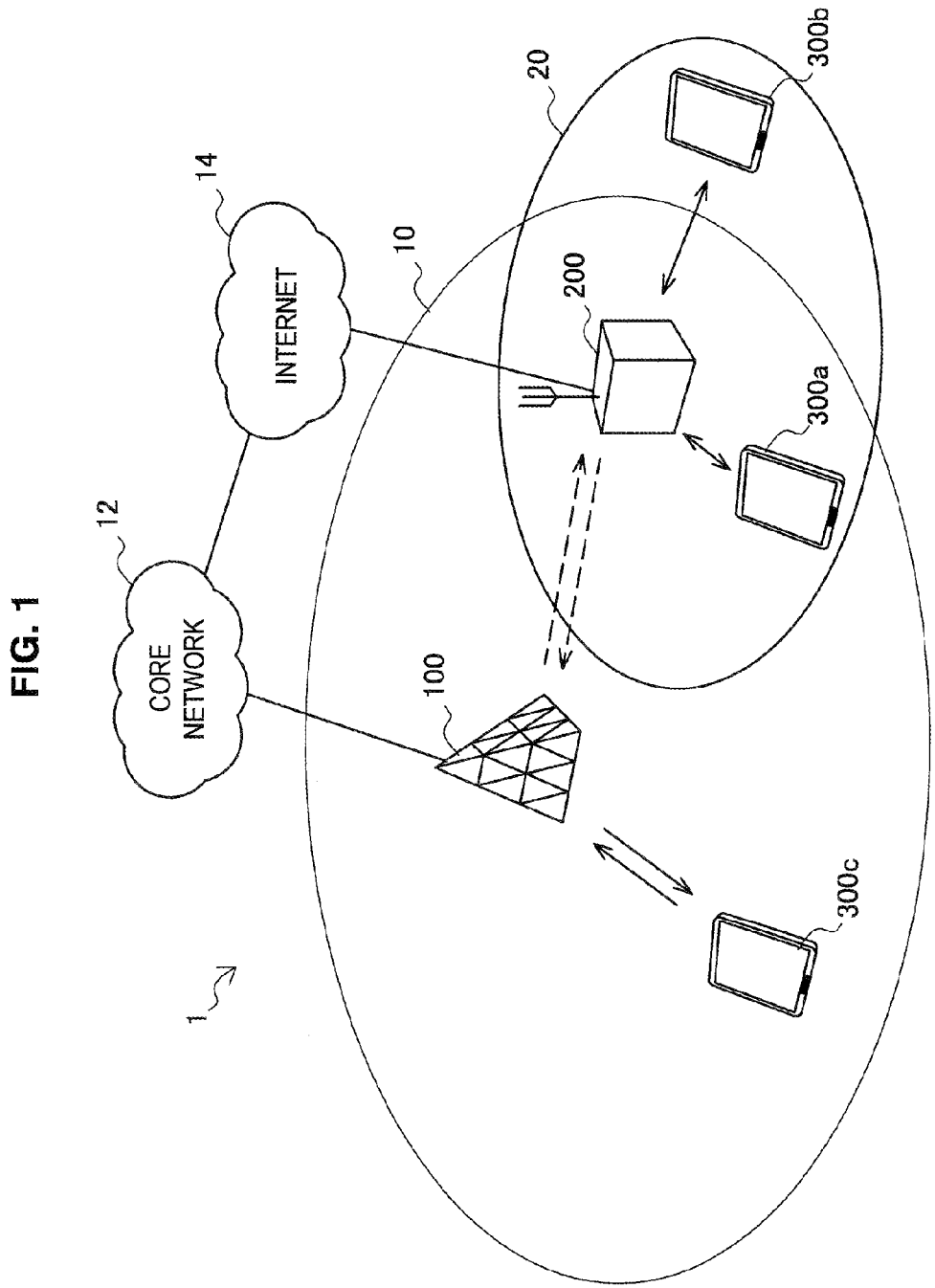
FIG. 1 is an explanatory diagram showing an outline of a communication control system according to an embodiment.

FIG. 1 is an explanatory diagram showing an outline of a communication control system 1 according to an embodiment of the technology according to the present disclosure. Referring to FIG. 1, the communication control system 1 includes a macrocell base station 100, a small cell base station 200, and terminal apparatuses 300a, 300b, and 300c.

The macrocell base station 100 is a communication control apparatus that operates a primary system on a frequency resource assigned to (for example, granted legally or a use right of which is given) a radio communication system of a macrocell (hereinafter referred to as primary system). The macrocell base station 100 transmits and receives radio signals to/from a terminal apparatus located within a macrocell 10 with a frequency division duplex (FDD) scheme. A frequency resource used for transmission of radio signals from the terminal apparatus to the macrocell base station 100 is referred to as uplink resource, and a frequency resource used for transmission of radio signals from the macrocell base station 100 to the terminal apparatus is referred to as downlink resource. The macrocell base station 100 may be operated as eNB (evolved node B) with an LTE-A (long term evolution-advanced) scheme, for example. Alternatively, the macrocell base station 100 may be operated in accordance with a cellular communication scheme of a different type, such as W-CDMA (wideband-code division multiple access). The macrocell base station 100 is connected to a core network 12.

The small cell base station 200 is a communication control apparatus that operates, when secondary use of the frequency resource assigned to the primary system is granted, a radio communication system of a small cell on the granted frequency resource (hereinafter referred to as secondary system). The small cell base station 200 transmits and receives radio signals to/from a terminal apparatus located within a small cell 20 with a time division duplex (TDD) scheme. In the present specification, a small cell is a concept encompassing femtocells, nanocells, picocells, microcells, and the like. The small cell base station 200 has a communication link with the macrocell base station 100. In this embodiment, an example in which the communication link is a downlink of an air interface from the macrocell base station 100 will be mainly described. However, the communication link may be a communication link of a different type (e.g., a wired link such as an X2 interface). The small cell base station 200 may be connected to the core network 12 via an internet 14.

Each of the terminal apparatuses 300a, 300b, and 300c is a radio communication terminal. In the example shown in FIG. 1, the terminal apparatuses 300a and 300b are connected to the small cell base station 200, and operated with the TDD scheme. On the frequency resource that is granted to be used secondarily (hereinafter referred to as resource for secondary use), the terminal apparatuses 300a and 300b transmit radio signals to the small cell base station 200 at a certain timing, and receive radio signals from the small cell base station 200 at a different timing. The terminal apparatus 300c is connected to the macrocell base station 100, and operated with the FDD scheme. The terminal apparatus 300c transmits radio signals to the macrocell base station 100 on the uplink resource, and receives radio signals from the macrocell base station 100 on the downlink resource regardless of timings.

The terminal apparatuses 300a, 300b, and 300c may each be a radio communication terminal of any type, such as a smartphone, a personal computer (PC), a personal digital assistant (PDA), a portable navigation device (PND), or a game console. Further, the terminal apparatuses 300a, 300b, and 300c may each be a dual mode apparatus that can be operated with both the FDD scheme and the TDD scheme. Note that, in the present specification, in a case in which the terminal apparatuses 300a, 300b, and 300c do not need to be discriminated from each other, the terminal apparatuses 300a, 300b, and 300c are collectively referred to as terminal apparatus 300 by omitting the alphabetical characters after the reference numeral. The same holds true for other structural elements.

[1-2. Configuration Example of Resource]

Figure 2:
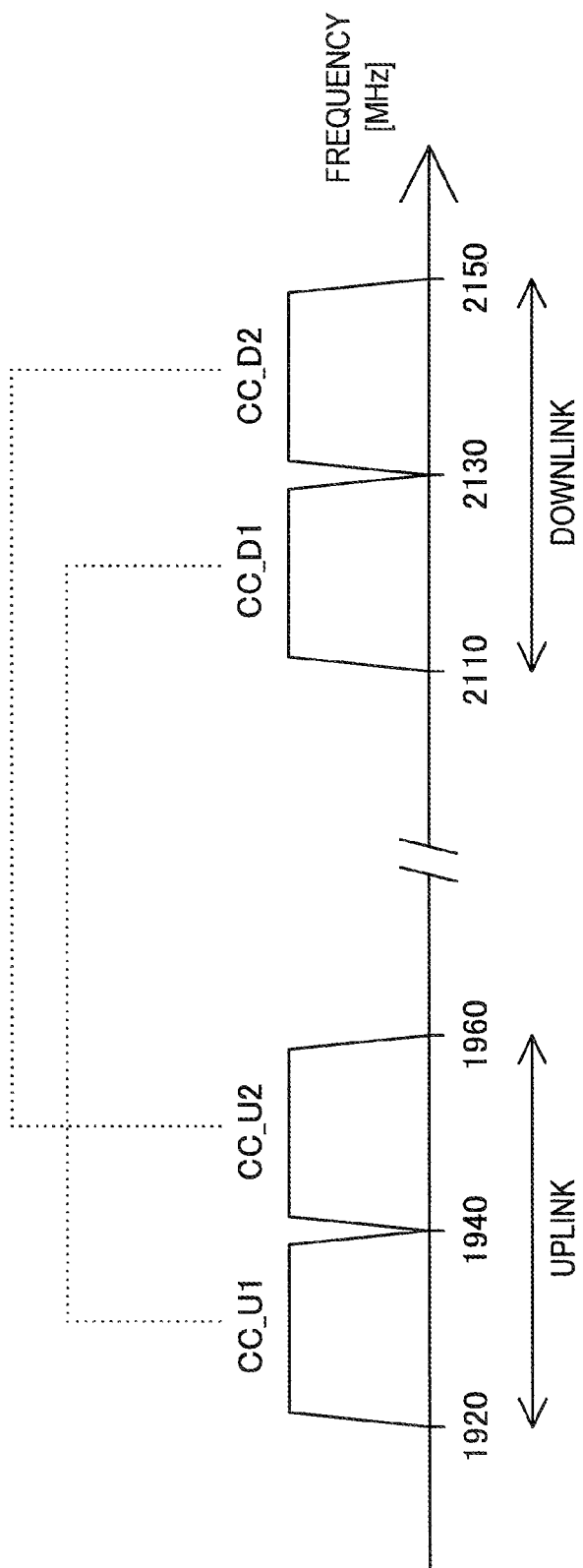
FIG. 2 is an explanatory diagram showing an example of carrier aggregation.

Next, referring to FIG. 2 to FIG. 4, an example of a resource configuration will be described. The technology according to the present disclosure typically assumes a resource configuration in which an individual resource is specified by frequency and time. A resource of a macrocell operated with the FDD scheme is divided into the uplink resource and the downlink resource in a frequency region. The uplink resource and the downlink resource can each be further divided into smaller units of a frequency resource. In addition, one or more units of a frequency resource can be released in the small cell as the resource for secondary use.

As an example, in the LTE-A scheme, the carrier aggregation technique enables the uplink resource and the downlink resource of a macrocell to be configured by integration of a plurality of component carriers. The more the concurrently usable component carriers are in number, the higher the data rate becomes; however, the number of usable component carriers is dependent on the capability of the device. FIG. 2 is an explanatory diagram showing an example of carrier aggregation. Referring to FIG. 2, four component carriers CC_U1, CC_U2, CC_D1, and CC_D2 are shown. The component carrier CC_U1 is an uplink resource (uplink CC) occupying a band from 1920 MHz to 1940 MHz. The component carrier CC_U2 is an uplink resource (uplink CC) occupying a band from 1940 MHz to 1960 MHz. The component carrier CC_D1 is a downlink resource (downlink CC) occupying a band from 2110 MHz to 2130 MHz. The component carrier CC_D2 is a downlink resource (downlink CC) occupying a band from 2130 MHz to 2150 MHz. Among the component carriers, for example, when the component carriers CC_U1 and CC_D1 are paired, a grant for uplink transmission on the component carrier CC_U1 is broadcasted from a macrocell base station on the component carrier CC_D1. In a similar manner, when the component carriers CC_U2 and CC_D2 are paired, a grant for uplink transmission on the component carrier CC_U2 is broadcasted from the macrocell base station on the component cattier CC_D2.

Figure 3:
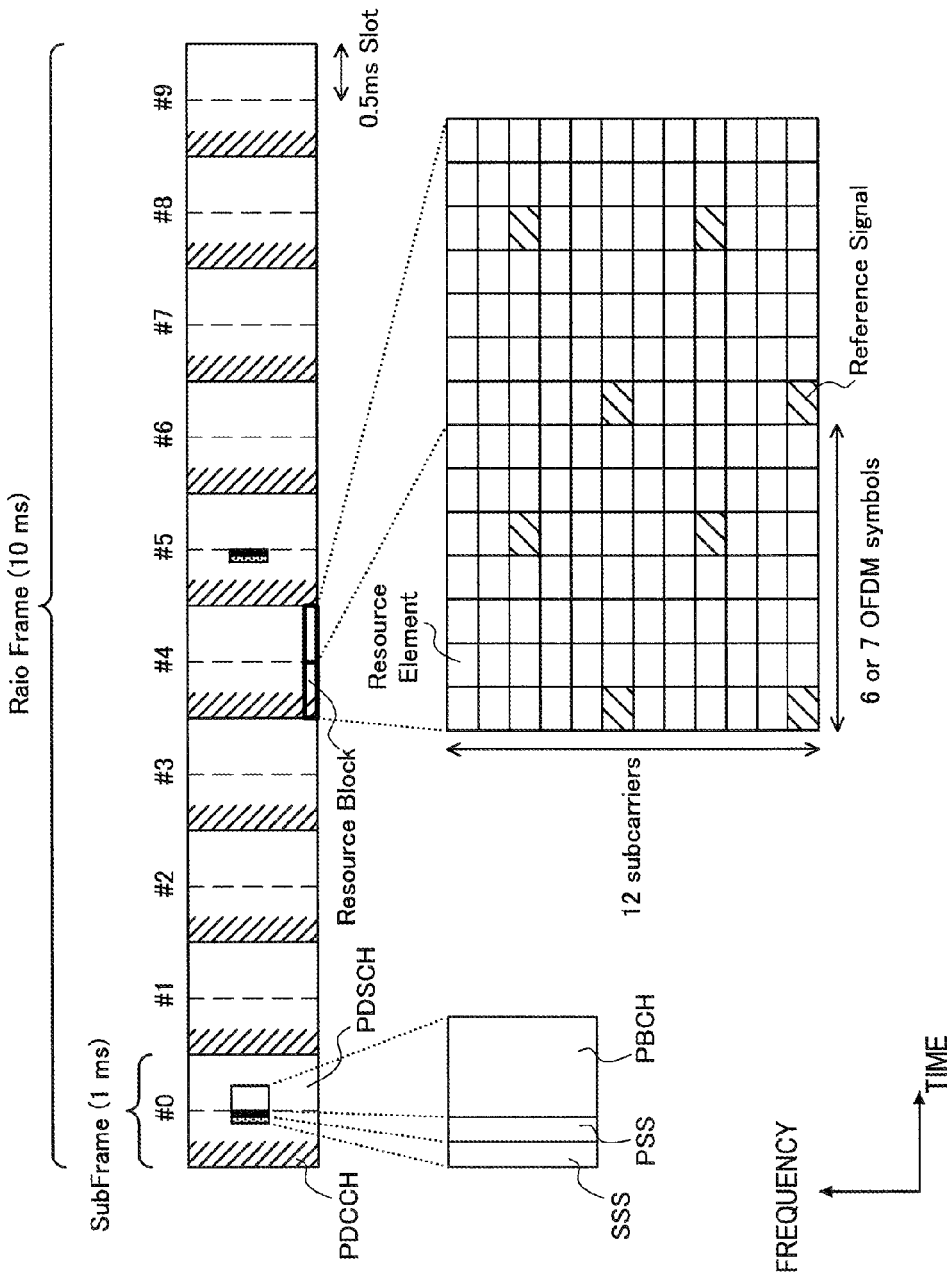
FIG. 3 is an explanatory diagram showing an example of a downlink frame format.

FIG. 3 is an explanatory diagram showing an example of a downlink frame format in an LTE-A scheme. Referring to FIG. 3, one radio frame having a time length of 10 ms is shown. The one radio frame is composed of 10 subframes #0 to #9 each having a time length of 1 ms. Each subframe is composed of two time slots each having a time length of 0.5 ms. One time slot includes seven OFDM symbols (six OFDM symbols in a case in which an extended cyclic prefix is used) in a time region. The traffic is scheduled (the downlink is assigned) in a unit of a resource block. Each resource block includes one time slot in the time region and twelve subcarriers in the frequency region. A resource element is a unit that is smaller than the resource block and is specified by one OFDM symbol and one subcarrier.

A primary synchronization signal (PSS) and a secondary synchronization signal (SSS) are inserted to the first half of each time slot from the 0-th downlink subframe (#0) to the 5-th downlink subframe (#5). PSS and SSS are used by the terminal to synchronize with the cell and to identify individual cells. The position of frequency of PSS and SSS is fixed to the center of the frequency channel regardless of the bandwidth. After PSS of the 0-th downlink subframe, a physical broadcast channel (PBCH) is disposed. A master information block (MIB) including static system information is transferred on a broadcast channel (BCH) mapped on PBCH. MIB includes information on the downlink bandwidth, the number of transmission antennas of the base station, control information configuration, and the like, for example. Meanwhile, a system information block (SIB) that transfers dynamic system information is transferred on a downlink shared channel (DL-SCH) mapped on the physical downlink shared channel (PDSCH). SIB includes information on the uplink bandwidth, parameters for random access, power control parameters, adjacent cell information, and the like. In some resource elements within each resource block, a reference signal that is used when the terminal measures channel quality is disposed. The position of the reference signal can be shifted according to the cell. Scheduling information is transferred on a physical downlink control channel (PDCCH). The scheduling information includes downlink assignment that is scrambled by using identification information associated with each terminal (e.g., radio network temporary identifier (RNTI)). Each terminal can descramble the scheduling information by using the identification information assigned to the terminal and acquire downlink assignment of the terminal.

Figure 4:
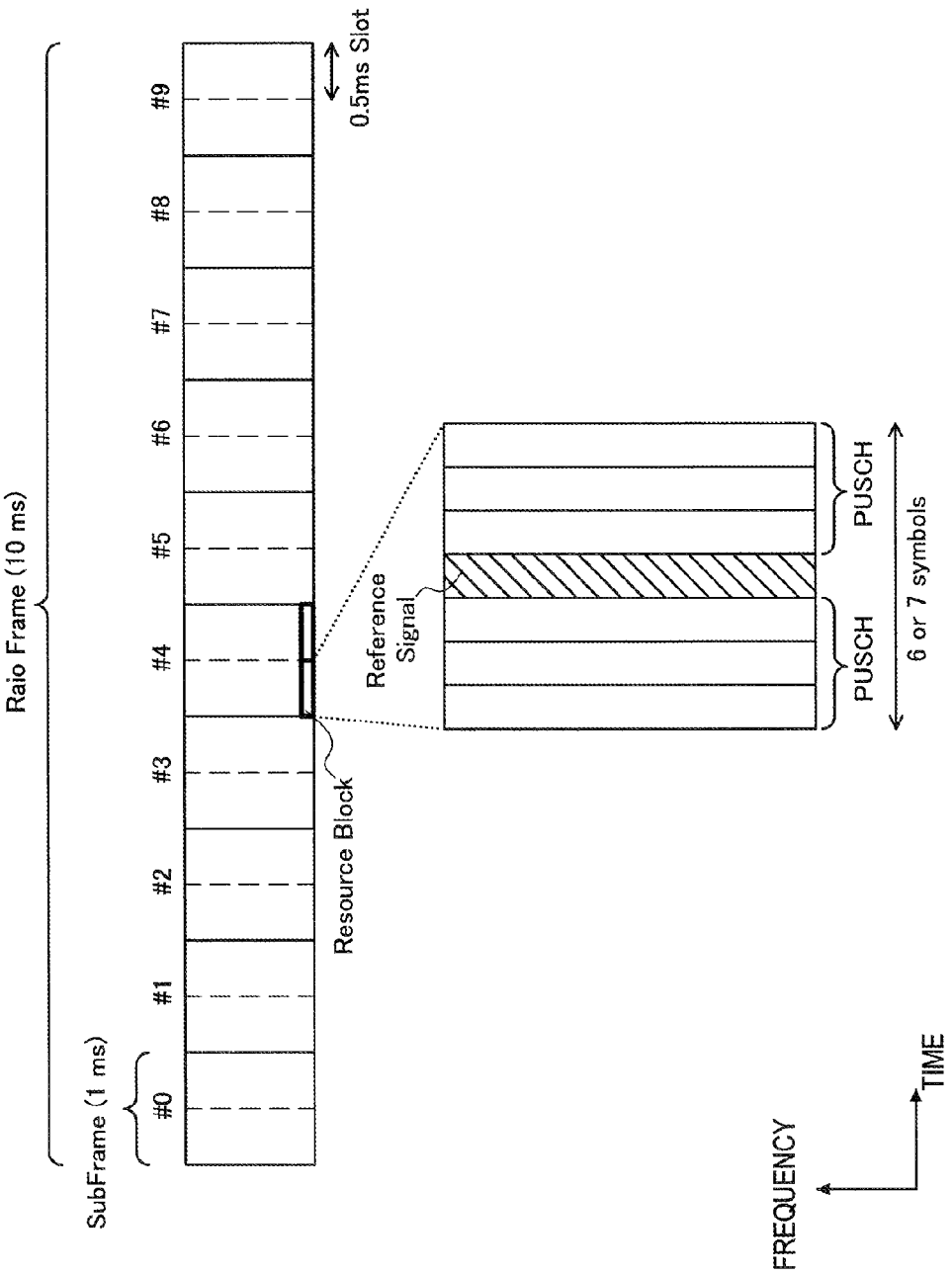
FIG. 4 is an explanatory diagram showing an example of an uplink frame format.

FIG. 4 is an explanatory diagram showing an example of an uplink frame format in an LTE-A scheme. Also in the uplink, one radio frame is composed of 10 subframes #0 to #9 each having a time length of 1 ms. Each subframe is composed of two time slots each having a time length of 0.5 ms. One time slot includes seven or six SC-FDMA symbols in the time region. The traffic is scheduled (the uplink is granted) in a unit of a resource block. The uplink grant is shown normally by the scheduling information on PDCCH of a downlink subframe that is 4 frames earlier than the granted uplink subframe. In a manner similar to that of the downlink assignment, the uplink grant can be scrambled by using the identification information associated with each terminal. On the fourth symbol of each resource block, a reference signal of the uplink is disposed.

[1-3. Description of Problems]

In a case in which secondary use of a frequency resource inside or in the vicinity of a macrocell is granted to the small cell, a macrocell base station can easily control interference by selecting an uplink resource as the resource for secondary use. This is because interference generated on the uplink resource influences only reception quality of an uplink signal in the base station on the macrocell side. Further, eNB of the LTE-A scheme has a mechanism to control communication for each component carrier in order to secure backward compatibility with a terminal that does not support carrier aggregation. Accordingly, when a frequency resource in a unit of a component carrier is released to the small cell, dynamic secondary use of a frequency resource becomes possible comparatively easily without changing the existing mechanism largely. Accordingly, in this embodiment, the macrocell base station 100 selects the uplink CC as the resource for secondary use in a unit of a component carrier. Note that in other embodiments, the downlink resource may be selected as the resource for secondary use. Further, the resource for secondary use may be selected in a unit other than the component carrier.

Incidentally, in the recent radio communication environment in which the traffic rapidly increases and temporal change in the amount of traffic is large, if one or more component carriers are released fixedly for the small cell, on the contrary, a vacant resource or lack of resource will be generated in the macrocell or the small cell. Accordingly, it is desirable that the release of a resource, that is, grant of the resource for secondary use, is performed dynamically. However, existing techniques do not have a means by which the macrocell notifies the small cell about the period in which secondary use is granted, and accordingly, it has been difficult to dynamically perform the grant of the resource for secondary use. Further, a means for preventing the generation of harmful interference due to the secondary use has been insufficient. Furthermore, in a case in which the grant of the resource for secondary use is performed dynamically, it is required that a session of a terminal that is being connected to the small cell is controlled properly. In embodiments that will be described in detail from the following section, some of these problems can be solved or relieved.

<2. Configuration of Macrocell Base Station>

First, the macrocell base station 100 will be described with reference to FIG. 5 to FIG. 8.

[2-1. Configuration Example of Apparatus]

Figure 5:
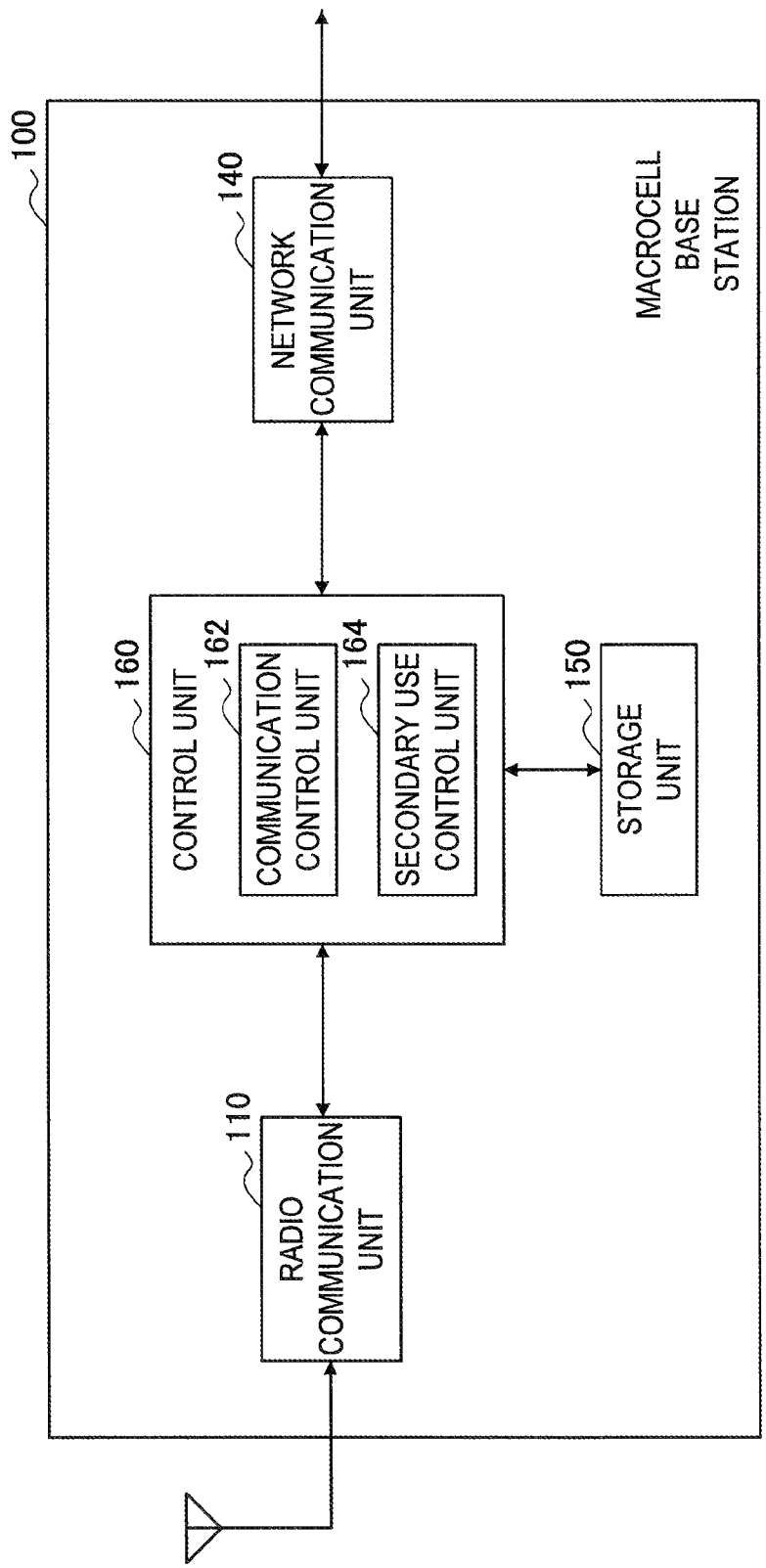
FIG. 5 is a block diagram showing an example of a configuration of a macrocell base station according to an embodiment.

FIG. 5 is a block diagram showing an example of a configuration of the macrocell base station 100 according to an embodiment. Referring to FIG. 5, the macrocell base station 100 includes a radio communication unit 110, a network communication unit 140, a storage unit 150, and a control unit 160.

(1) Radio Communication Unit

The radio communication unit 110 is a radio communication interface that is operated with the FDD scheme. The radio communication unit 110 transmits downlink signals on the downlink resource and receives uplink signals on the uplink resource to/from the terminal apparatus 300 that is connected to the macrocell base station 100. Further, in this embodiment, the radio communication unit 110 transmits grant information that specifies the resource for secondary use. The grant information is associated with a period during which secondary use is granted (hereinafter referred to as secondary use period). The radio communication unit 110 may broadcast the grant information as a piece of the scheduling information or system information on the downlink resource (e.g., the uplink CC to be released or the downlink CC to be paired), for example. Accordingly, it becomes possible to notify an apparatus located within the macrocell 10 about the grant information without providing a channel dedicated to control of secondary use.

Further, the radio communication unit 110 may scramble the grant information to be broadcasted by using the identification information that is defined commonly for an apparatus that decodes the grant information. In this case, in a manner similar to an operation of acquiring normal scheduling information, each apparatus can acquire the grant information. An apparatus that is not involved in secondary use does not need to be conscious of the existence of the grant information. grant information. Accordingly, it becomes possible to notify the grant information while maintaining the frame of existing scheduling information.

(2) Network Communication Unit

The network communication unit 140 is a communication interface that is connected to the core network 12 shown in FIG. 1. The network communication unit 140 relays a communication packet included in uplink signals received by the radio communication unit 110 to the core network 12. Further, the network communication unit 140 receives a communication packet to be transmitted by use of downlink signals from the core network 12. Furthermore, the network communication unit 140 exchanges control signaling with a control node (e.g., mobility management entity (MME)) on the core network 12 (via an S1 interface, for example). The network communication unit 140 also exchanges control signaling with a base station of an adjacent cell (via an X2 interface, for example).

(3) Storage Unit

The storage unit 150 stores a program and data for operations of the macrocell base station 100 by using a storage medium such as a hard disk or a semiconductor memory.

(4) Control Unit

The control unit 160 controls general operations of the macrocell base station 100 by using a processor such as a central processing unit (CPU) or a digital signal processor (DSP). In this embodiment, the control unit 160 includes a communication control unit 162 and a secondary use control unit 164.

The communication control unit 162 operates a primary system with the FDD scheme on a frequency resource that is assigned to the primary system. In the example shown in FIG. 2, frequency bands of 1920 to 1960 MHz and of 2110 to 2150 MHz are assigned to the primary system. The communication control unit 162 can divide these frequency bands into four component carriers CC_U1, CC_U2, CC_D1, and CC_D2, for example, to use the component carriers CC_U1 and CC_U2 as the uplink CC and the component carriers CC_D1 and CC_D2 as the downlink CC.

In this embodiment, the communication control unit 162 has a function as a scheduler. The communication control unit 162 grants, for example, uplink transmission of the terminal apparatus 300 on the uplink CC according to a request from the terminal apparatus 300. Further, when traffic addressed to the terminal apparatus 300 arrives a gateway on the core network 12, the communication control unit 162 assigns downlink transmission on the downlink CC to the terminal apparatus 300.

The secondary use control unit 164 decides the resource for secondary use that is granted to be used secondarily by another system, within the frequency resource assigned to the primary system. In this embodiment, the resource for secondary use is included in the uplink resource. As an example, the grant of secondary use is given in a unit of a component carrier in the frequency region, and in a unit of a subframe in the time region. Note that, without limitation to this example, the grant of secondary use may be given in another unit (e.g., a unit of a radio frame).

For example, the secondary use control unit 164 may predict future use rate of the frequency resource from the traffic amount recognized by the communication control unit 162 through buffer signaling, and may grant secondary use of the uplink CC in a period during which a vacant frequency resource is predicted. Further, the secondary use control unit 164 may predict temporal change in the amount of traffic on the basis of previous communication history within the macrocell 10. Furthermore, the secondary use control unit 164 may grant secondary use on the basis of the number of users (the number of active users) who are connected to the macrocell base station 100. The communication control unit 162 and the secondary use control unit 164 may cooperate with each other, and for a component carrier for which secondary use is decided to be granted, the scheduling of communication of the primary system within the secondary use period may be spared. Then, the secondary use control unit 164 generates the grant information associated with the secondary use period. The grant information generated by the secondary use control unit 164 is scrambled by the radio communication unit 110 and then is broadcasted on the downlink CC.

FIGS. 6A and 6B are each an explanatory diagram showing an example of the grant information transmitted from the macrocell base station 100. Referring to the upper part of FIG. 6A, in the component carrier CC_D2 among four component carriers operated by the macrocell base station 100, the grant information is inserted into subframes $S_{D01}$ to $S_{D05}$. These pieces of the grant information specify the component carrier CC_U2 as the resource for secondary use, for example. The position of the resource for secondary use in the frequency region may be specified by use of the number that is given in advance to each component carrier. Further, the grant information is associated with the period during which secondary use is granted. The grant information may explicitly include parameters that specify a subframe in which secondary use is granted (e.g., the number of a radio frame and the number of a subframe, or the number of subframes lying until the subframe in which secondary use is granted). Alternatively, the grant information inserted into an i-th subframe may implicitly indicate that secondary use is granted in an (i+n)-th subframe.

In the example shown in FIG. 6A, the grant information implicitly indicate that secondary use is granted in a subframe that is ahead of the subframe, into which the grant information is inserted, by n subframes (n is an integer defined in advance. For example, n=8.). The grant information is inserted into the component carrier CC_D2 in each of the subframes $S_{D01}$ to $S_{D05}$. Accordingly, during the period from a subframe $S_{U09}$ to a subframe $S_{U13}$, the component carrier CC_U2 is released as the resource for secondary use. In the example shown in FIG. 6B, the grant information explicitly includes a number n of subframes lying until the subframe in which the secondary use period starts and a period length k of the secondary use period (n and k are dynamically specified). The grant information is inserted into the component carrier CC_D2 in the i-th subframe $S_{D01}$. In this case, throughout the period from the (i+n)-th subframe $S_{U09}$ to the (i+n+k−1)-th subframe $S_{U13}$, the component carrier CC_U2 is released as the resource for secondary use. The small cell base station 200 can receive such grant information and operate the secondary system with the TDD scheme during the subframes $S_{U09}$ to $S_{U13}$ on the component carrier CC_U2.

In this embodiment, the secondary use control unit 164 also controls interference that can be generated by secondary use of a frequency resource. For example, the secondary use control unit 164 may decide, as the resource for secondary use, a resource that is determined to have lower risk of interfering with an adjacent cell on the basis of an indicator for inter-cell interference coordination (ICIC) notified between cells of the primary system (that is, between macrocells).

Figure 7:
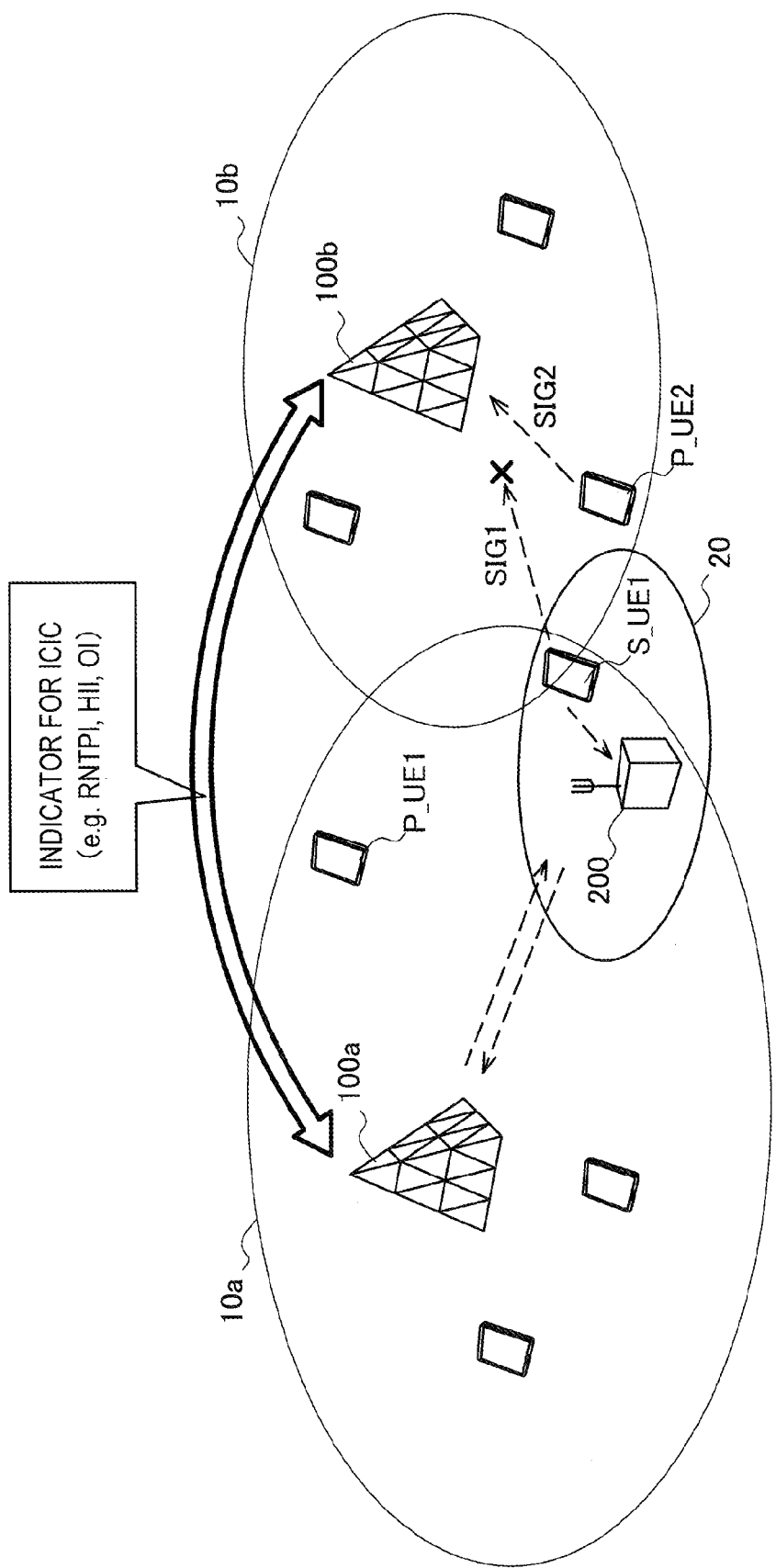
FIG. 7 is an explanatory diagram showing decision of a resource for secondary use by using an indicator for inter-cell interference coordination.

FIG. 7 is an explanatory diagram showing decision of the resource for secondary use by using an indicator for inter-cell interference coordination. Referring to FIG. 7, a macrocell 10a operated by a macrocell base station 100a is adjacent to a macrocell 10b operated by a macrocell base station 100b. Further, the small cell 20 operated by the small cell base station 200 is located near the boundary between the macrocell 10a and the macrocell 10b. An uplink signal SIG1 transmitted from a terminal apparatus S_UE1 connected to the small cell base station 200 has a risk of giving harmful interference to an uplink signal SIG2 from a terminal apparatus P_UE2 connected to the macrocell base station 100b. In order to prevent such a risk, the secondary use control unit 164 can use an indicator for inter-cell interference coordination (ICIC) exchanged between the macrocell base station 100a and the macrocell base station 100b. The indicator for ICIC includes, for example, at least one of relative narrow band TX power indicator (RNTPI), high interference indicator (HII), and overload indicator (OI).

RNTPI specifies a resource block of a downlink (for which a relatively large transmission power is set) assigned to a terminal near a cell edge in a cell of RNTPI on the transmission side. The secondary use control unit 164 may decide preferentially, as the resource for secondary use, a component carrier whose ratio of the resource block is low, the resource block being specified by RNTPI received from a base station of the adjacent cell (or a CC paired with the relevant CC). Accordingly, it becomes possible to prevent radio signals from the small cell that secondarily uses the resource for secondary use, from generating harmful interference in a large number of resource blocks of the adjacent cell.

HII specifies a resource block assigned to a terminal near the cell edge in the cell of HII on the transmission side. OI specifies a resource block to which interference beyond a threshold value in the cell of OI on the transmission side is given. The secondary use control unit 164 may decide preferentially, as the resource for secondary use, a component carrier whose ratio of the resource block is low, the resource block being specified by HII or OI received from the base station of the adjacent cell (or a CC paired with the relevant CC). Also in this case, it becomes possible to prevent radio signals from the small cell that secondarily uses the resource for secondary use, from generating harmful interference in a large number of resource blocks of the adjacent cell.

Further, the secondary use control unit 164 may notify the base station of the adjacent cell about the indicator for ICIC via the network communication unit 140 so that interference with the adjacent cell can be suppressed in the resource for secondary use that is granted to be used for secondary use in the local macrocell. That is, the existing indicator for ICIC can also be used in order to suppress interference due to secondary use. For example, the secondary use control unit 164 can transmit HII that specifies a resource block included in the resource for secondary use to the base station of the adjacent cell. Accordingly, it becomes possible to reduce a risk of a resource block being used in the adjacent cell, the resource block being possibly interfered owing to radio signals from the small cell that secondarily uses the resource for secondary use.

[2-2. Example of Flow of Processing]

Figure 8:
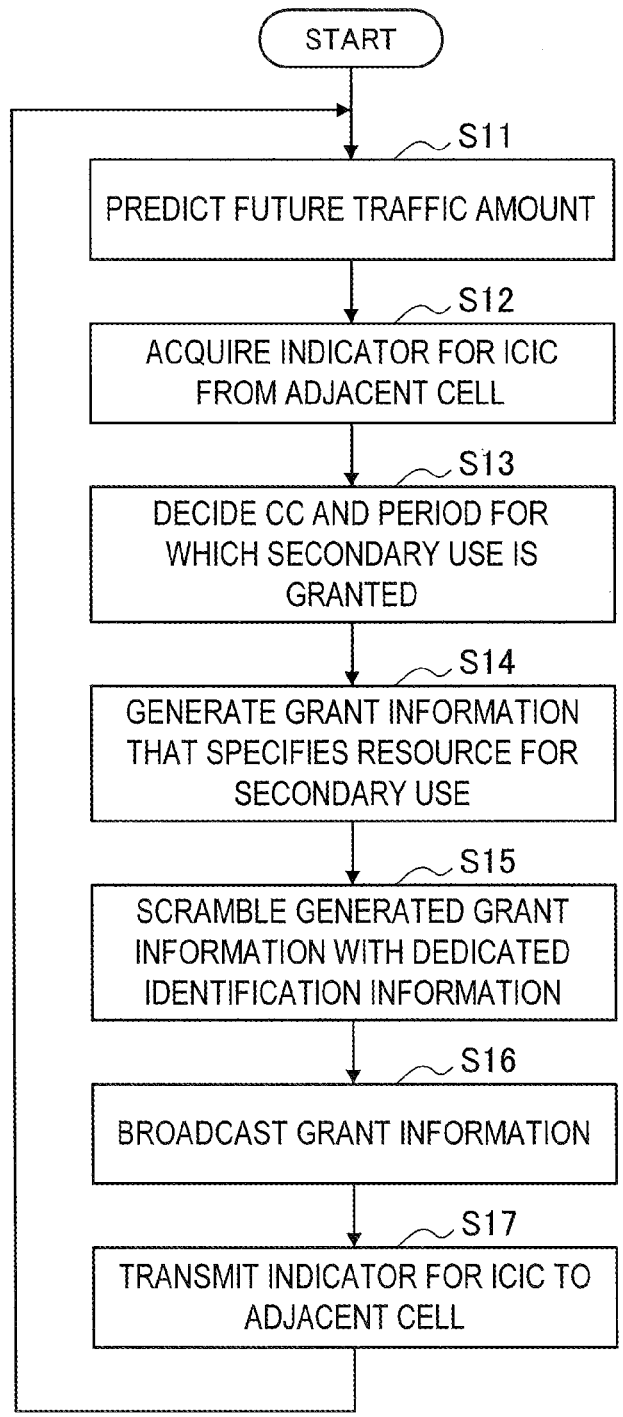
FIG. 8 is a flowchart showing an example of a flow of communication control processing by a macrocell base station according to an embodiment.

FIG. 8 is a flowchart showing an example of a flow of communication control processing by the macrocell base station 100 according to this embodiment.

Referring to FIG. 8, first, the communication control unit 162 predicts the amount of traffic of the primary system, the amount being assumed for some future subframes (step S11).

The secondary use control unit 164 acquires the indicator for ICIC (e.g., RNTPI, HII, or OI) received from the adjacent cell via the network communication unit 140 (step S12). Note that an indicator defined newly for the purpose of secondary use may be used instead of the indicator for ICIC.

Next, on the basis of the predicted traffic amount and the indicator for ICIC, the secondary use control unit 164 decides a component carrier for which secondary use is granted and a period thereof (step S13).

Next, the secondary use control unit 164 generates grant information that specifies the resource for secondary use and that is associated with the secondary use period (step S14).

Then, the radio communication unit 110 scrambles the grant information generated by the secondary use control unit 164 with the identification information for secondary use (step S15).

Then, the radio communication unit 110 broadcasts the grant information on the downlink CC (step S16).

Further, the secondary use control unit 164 transmits, to the base station of the adjacent cell via the network communication unit 140, the indicator for ICIC that specifies a resource block included in the resource for secondary use for which secondary use has been granted (step S17).

<3. Configuration of Small Cell Base Station>

Next, the small cell base station 200 will be described with reference to FIG. 9 to FIG. 13.

[3-1. Configuration Example of Apparatus]

Figure 9:
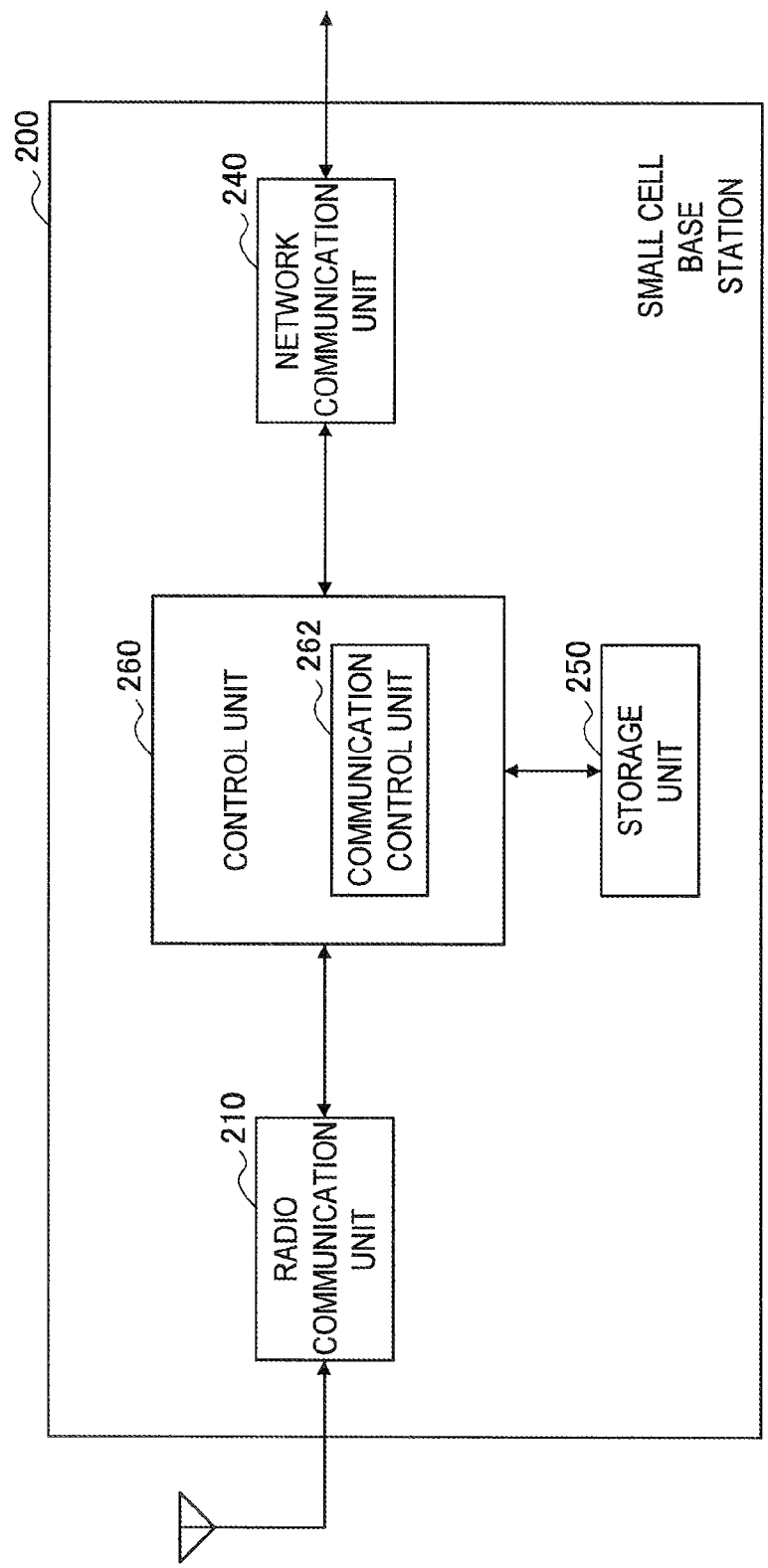
FIG. 9 is a block diagram showing an example of a configuration of a small cell base station according to an embodiment.

FIG. 9 is a block diagram showing an example of a configuration of the small cell base station 200 according to an embodiment. Referring to FIG. 9, the small cell base station 200 includes a radio communication unit 210, a network communication unit 240, a storage unit 250, and a control unit 260.

(1) Radio Communication Unit

The radio communication unit 210 is a radio communication interface that is operated with the FDD scheme and the TDD scheme. The radio communication unit 210 is connected to the macrocell base station 100 operated with the FDD scheme and receives the above described grant information from the macrocell base station 100 on the downlink resource. The grant information specifies the resource for secondary use within the frequency resource assigned to the primary system and is associated with the secondary use period. In this embodiment, the resource for secondary use is included in the uplink resource of the primary system. As an example, the grant information specifies the resource for secondary use in a unit of a component carrier in the frequency region and is explicitly or implicitly associated with the secondary use period decided in a unit of a subframe in the time region. The radio communication unit 210 may receive the grant information as a piece of the scheduling information or the system information on the downlink resource of the primary system, for example. The radio communication unit 210 descrambles the received grant information by using the identification information, such as RNTI, which is commonly defined for an apparatus that decodes the grant information, for example (information that has successfully performed decoding by using the identification information is the grant information).

Further, the radio communication unit 210 transmits and receives radio signals with the TDD scheme to/from the terminal apparatus 300 that is connected to the small cell base station 200 on the resource for secondary use specified by the grant information in order to achieve the small cell.

Figure 10:
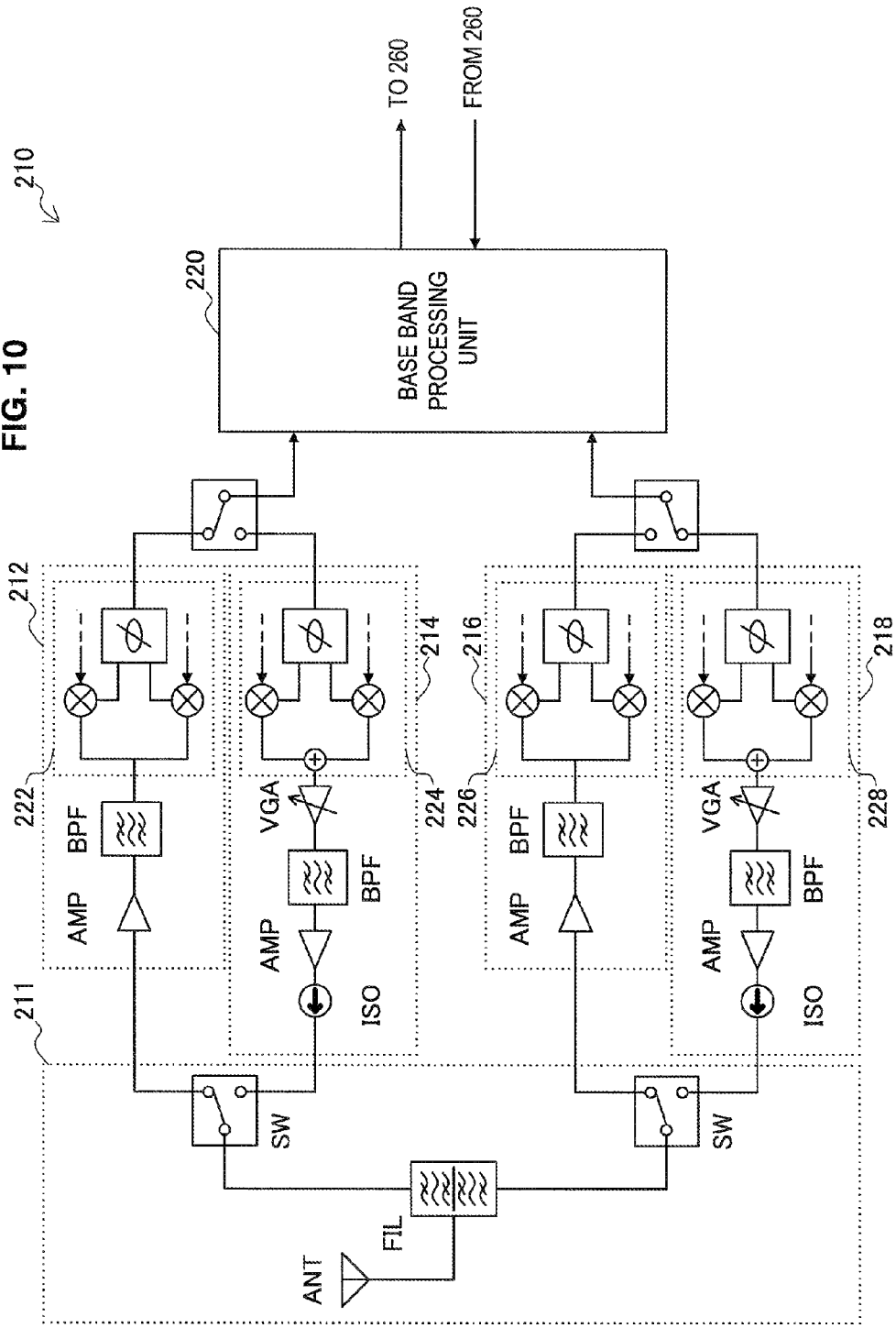
FIG. 10 is a block diagram showing an example of a detailed configuration of a radio communication unit shown in FIG. 9.

FIG. 10 is a block diagram showing an example of a detailed configuration of the radio communication unit 210 shown in FIG. 9. Referring to FIG. 10, the radio communication unit 210 includes an antenna section 211, a first reception section 212, a first transmission section 214, a second reception section 216, a second transmission section 218, and a base band processing unit 220.

The antenna section 211 includes a transmission and reception antenna (ANT), a filter (FIL), and two antenna switches (SW). Without limitation to the example shown in FIG. 10, the antenna section 211 may include more antennas.

Each of the first reception section 212 and the second reception section 216 includes a reception amplifier (AMP), a band-pass filter (BPF), and orthogonal demodulators 222 and 226. The orthogonal demodulators 222 and 226 each demodulate reception signals with a reception frequency adjusted by a frequency synthesizer (not shown).

The base band processing unit 220 decodes the reception signals demodulated by the first reception section 212 and the second reception section 216, and corrects errors thereof. Further, the base band processing unit 220 attempts to descramble the grant information received from the macrocell base station 100 by using the identification information that is defined in advance. Then, the base band processing unit 220 outputs, to the control unit 260, the grant information that has successfully performed descramble and decoding.

Each of the first transmission section 214 and the second transmission section 218 includes orthogonal modulators 224 and 228, a variable gain amplifier (VGA), a band-pass filter (BPF), a transmission amplifier (AMP), and an isolator (ISO). The orthogonal modulators 224 and 228 modulate transmission signals that are encoded by the base band processing unit 220 with a transmission frequency that is adjusted by a frequency synthesizer (not shown).

For example, the first reception section 212 can be used to receive radio signals (e.g., FDD signals or TDD signals) from the terminal apparatus 300 connected to the small cell (or a neighboring small cell base station). The first transmission section 214 can be used to transmit radio signals (e.g., TDD signals) to the terminal apparatus 300 connected to the small cell (or a neighboring small cell base station). The second reception section 216 can be used to receive downlink signals (e.g., FDD signals) from the macrocell base station 100. The second transmission section 218 can be used to transmit FDD signals to the terminal apparatus, for example. Some of these sections may be operated at the same time. In this manner, by including a circuit for receiving downlink signals from the macrocell base station 100 independently of a circuit for radio communication within the small cell, while the secondary system is operated, the small cell base station 200 can maintain synchronization with the macrocell properly and can monitor the grant information from the macrocell base station 100 consecutively.

(2) Network Communication Unit

The network communication unit 240 is a communication interface connected to the internet 14 shown in FIG. 1. The network communication unit 240 may relay the communication packet of the small cell to be transmitted and received by the radio communication unit 210 via the internet 14. Further, the network communication unit 240 may exchange control signaling via the internet 14 with the neighboring small cell or macrocell base stations.

(3) Storage Unit

The storage unit 250 stores a program and data for operations of the small cell base station 200 by using a storage medium such as a hard disk or a semiconductor memory.

(4) Control Unit

The control unit 260 controls general operations of the small cell base station 200 by using a processor such as a CPU or a DSP. In this embodiment, the control unit 260 includes a communication control unit 262.

More specifically, the communication control unit 262 makes the frame timing of the radio communication unit 210 synchronize with the frame timing of the primary system in advance and causes the radio communication unit 210 to monitor the grant information broadcasted on the downlink resource from the macrocell base station 100. Then, when the grant information is received by the radio communication unit 210, the communication control unit 262 operates the secondary system with the TDD scheme in the secondary use period associated with the grant information on the resource for secondary use specified by the grant information.

In this embodiment, the communication control unit 262 controls the interference between small cells or interference between the small cell and the macrocell in the vicinity thereof.

Figure 11:
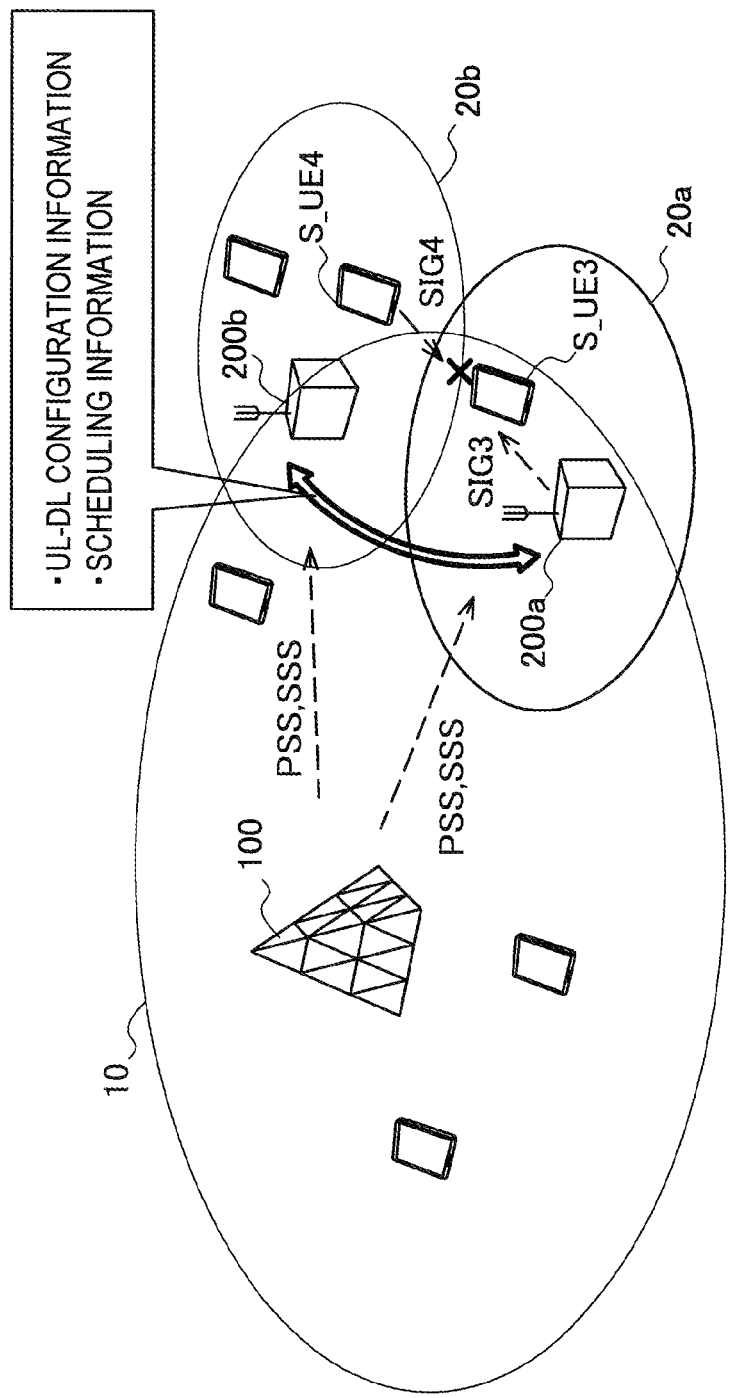
FIG. 11 is a first explanatory diagram showing a technique for interference control in a small cell.

FIG. 11 is a first explanatory diagram showing a technique for interference control in the small cell. Referring to FIG. 11, a small cell 20a operated by a small cell base station 200a is adjacent to a small cell 20b operated by a small cell base station 200b. A radio signal SIG3 transmitted to a terminal apparatus S_UE3 connected to the small cell base station 200a has a risk of interference with a radio signal SIG 4 transmitted from a terminal apparatus S_UE4 connected to the small cell base station 200b. More generally, if radio signals are transmitted and received haphazardly on the resource for secondary use in the small cell, there is a risk that mutually harmful interference is generated between a plurality of small cells and that harmful interference is generated from a small cell to a macrocell in the vicinity thereof. In order to prevent such a risk, in this embodiment, some measures are taken in the communication control unit 262.

Firstly, as described above, the communication control unit 262 makes the frame timing of the small cell synchronize with the frame timing of the primary system. The communication control unit 262 can make the frame timing of the small cell, operated by the local small cell base station, synchronize with the frame timing of the primary system by using PSS and SSS received from the macrocell base station 100. In a case in which the resource for secondary use of one primary system is secondarily used by a plurality of secondary systems, accordingly, the frame timing is synchronized between the plurality of secondary systems.

Secondly, the communication control unit 262 sets an uplink-downlink configuration (UL-DL configuration) that is common to a plurality of systems using the resource for secondary use, as the secondary system operated with the TDD scheme. The UL-DL configuration refers to a pattern of a link direction for each subframe. In a TD-LTE scheme, as the UL-DL configuration indicating the set of link directions according to subframes for one radio frame, seven patterns of UL-DL configurations are defined in advance. The communication control unit 262 senses radio signals transmitted from a neighboring secondary system when starting the operation of the secondary system, for example. In a case in which another neighboring secondary system exists, the communication control unit 262 receives UL-DL configuration information broadcasted from the neighboring secondary system and sets the UL-DL configuration indicated by the received UL-DL configuration information. On the other hand, in a case in which another neighboring secondary system does not exist, the communication control unit 262 broadcasts UL-DL configuration information indicating the UL-DL configuration selected by the local small cell base station on the resource for secondary use. Accordingly, another secondary system that starts operation sequentially can set the common UL-DL configuration.

Thirdly, the communication control unit 262 notifies another secondary system that uses the same resource for secondary use about the scheduling information related to a terminal located at the cell edge of the secondary system operated by the local small cell base station. Accordingly, it becomes possible to prevent transmission or reception of signals in another secondary system at the same timing as the transmission or reception of signals by the cell edge terminal in the secondary system.

Figure 12:
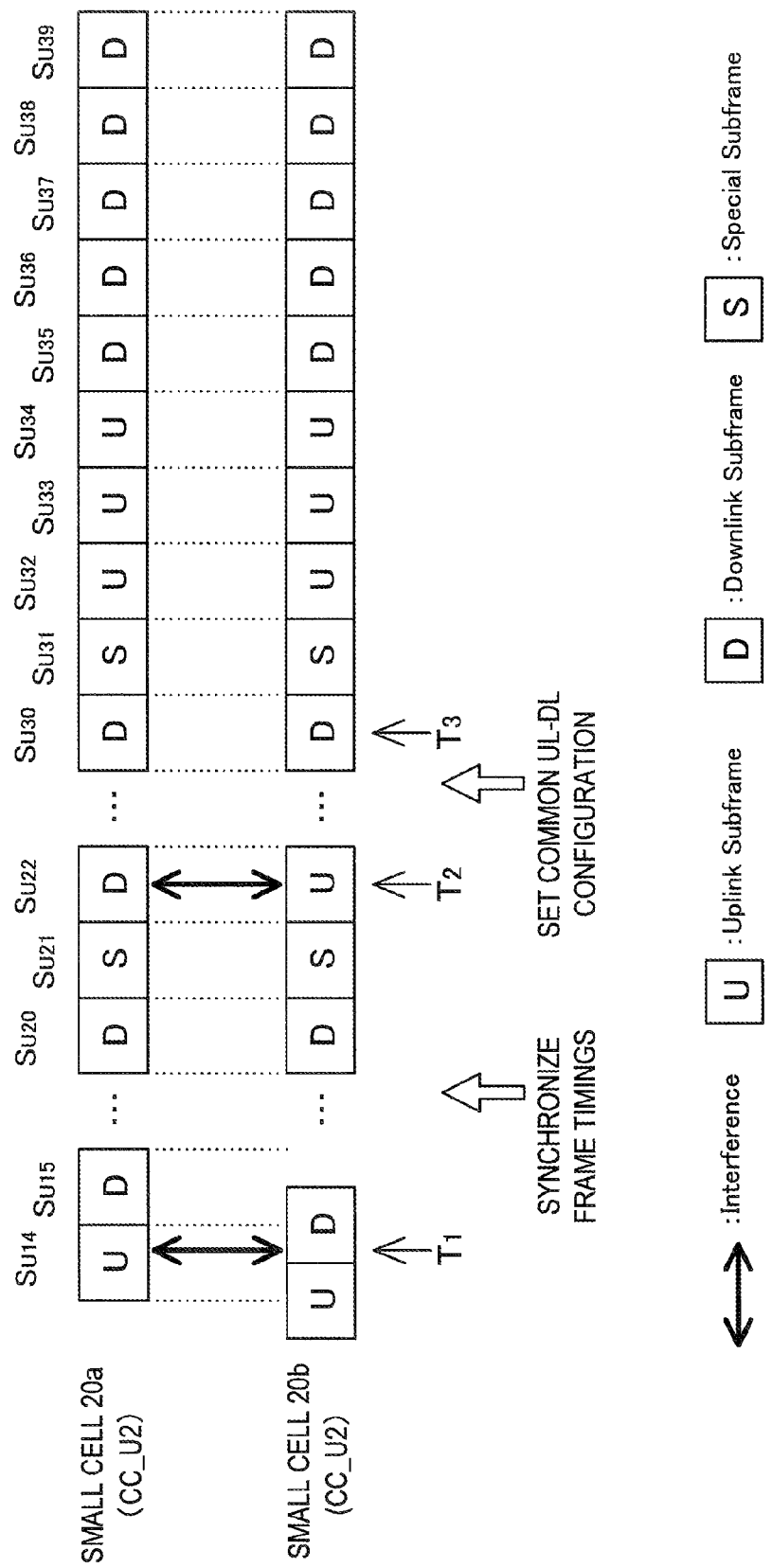
FIG. 12 is a second explanatory diagram showing a technique for interference control in a small cell.

FIG. 12 is a second explanatory diagram showing a technique for interference control in a small cell. Here, on the component carrier CC_U2, two small cells 20a and 20b are operated with the TDD scheme. Each square in the figure represents a subframe, and a label attached to each square represents a link direction (link direction based on the small cell base station) in each subframe. More specifically, the link direction of a subframe that is labeled as "D" is a downlink, and this subframe is called downlink subframe. The link direction of a subframe that is labeled as "U" is an uplink, and this subframe is called uplink subframe. A subframe that is labeled as "S" is a special subframe. The special subframe is inserted to prevent temporal overlap of reception of a downlink signal and transmission of an uplink signal in a terminal owing to a propagation delay of a signal at a timing of switching the downlink subframe to the uplink subframe.

At a time $T_1$, the frame timings of the two small cells are not synchronized with each other. Accordingly, even if a common UL-DL configuration is set, the uplink subframe and the downlink subframe might overlap with each other temporally. In the example in FIG. 12, at the time $T_1$, the uplink signal transmitted from the cell edge terminal of the small cell 20a highly possibly gives harmful interference to the reception of the downlink signal by the terminal of the small cell 20b. Synchronization of the frame timings of the two small cells eliminates such possibility.

In the situation in which frame timings synchronize with each other, when a common UL-DL configuration is not set, the uplink subframe and the downlink subframe might again overlap with each other temporally. In the example in FIG. 12, at a time $T_2$, the uplink signal transmitted from the cell edge terminal of the small cell 20b highly possibly gives harmful interference to the reception of the downlink signal by the terminal of the small cell 20a. By setting the common UL-DL configuration in the two small cells, such possibility is eliminated. At and after a time $T_3$ in FIG. 12, the frame timings are synchronized with each other between the two small cells and the common UL-DL configuration is set.

Note that the communication control unit 262 may prevent the generation of harmful interference at the timing by not assigning a resource block of a subframe having a different link direction from the adjacent cell to a terminal located at the cell edge, instead of setting the common UL-DL configuration. Further, the communication control unit 262 may reduce the interference by suppressing the transmission power from the terminal at the timing.

The measure for interference control described above may be applied to not only suppress the interference between small cells, but also suppress the interference between the small cell and the adjacent macrocell.

Further, in this embodiment, the communication control unit 262 gives an instruction of a handover (or reselection of a cell) to the primary system by the terminal that is connected to the secondary system before the period associated with the grant information ends. Accordingly, the communication control unit 262 can finish the secondary use that is granted temporarily without damaging the continuity of communication session of the terminal connected to the secondary system as much as possible. Prior to the instruction of a handover, the communication control unit 262 may cause each terminal to perform measurement and may determine the terminal that can be connected to the primary system.

[3-2. Example of Flow of Processing]

Figure 13:
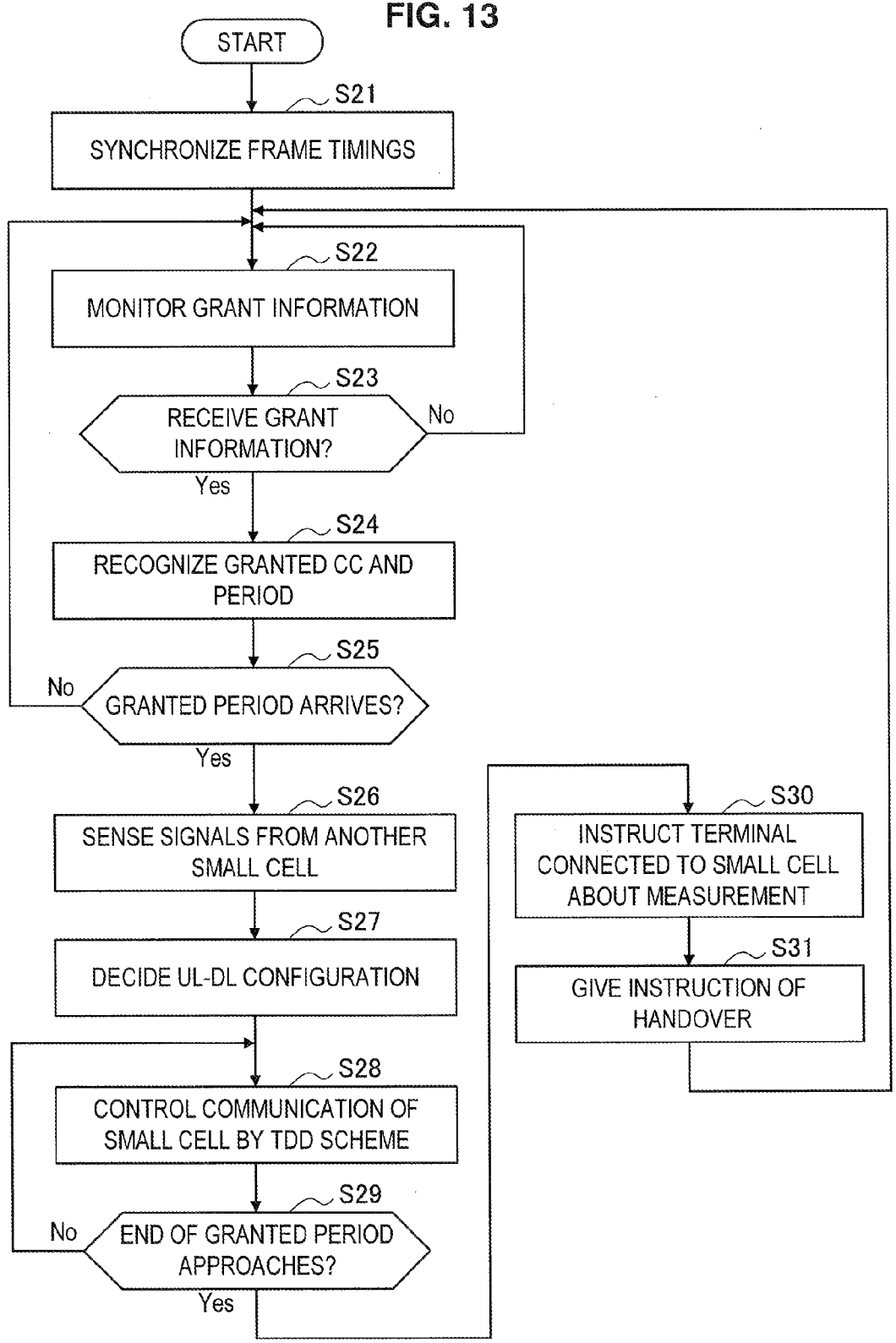
FIG. 13 is a flowchart showing an example of a flow of communication control processing by a small cell base station according to an embodiment.

FIG. 13 is a flowchart showing an example of a flow of communication control processing by the small cell base station 200 according to this embodiment.

Referring to FIG. 13, first, the communication control unit 262 makes the frame timing of the radio communication unit 210 synchronize with the frame timing of the primary system (step S21). Next, the communication control unit 262 causes the radio communication unit 210 to monitor the grant information broadcasted from the macrocell base station 100 on the downlink resource (step S22).

When the radio communication unit 210 receives the grant information (step S23), the communication control unit 262 recognizes the resource for secondary use specified by the received grant information and the period associated with the grant information (step S24). The monitoring of the grant information and the recognition of the resource for secondary use in a case in which the grant information is received may be repeated for each subframe.

When the secondary use period arrives (step S25), the communication control unit 262 first senses radio signals transmitted from another small cell (another secondary system) (step S26). Then, the communication control unit 262 decides the UL-DL configuration to be set (step S27). For example, in a case in which another neighboring small cell is present, the communication control unit 262 sets an UL-DL configuration that is common to the UL-DL configuration that is used by the another small cell as the secondary system of the local small cell base station. On the other hand, in a case in which another neighboring small cell is not present, the communication control unit 262 may set any UL-DL configuration as the secondary system of the local small cell base station.

After that, the communication control unit 262 controls communication of the small cell with the TDD scheme throughout the secondary use period (step S28). When the end of the secondary use period approaches (step S29), the communication control unit 262 instructs the terminal that is connected to the small cell about measurement (step S30). In response to the instruction here, measurement results are reported from the terminal. Then, the communication control unit 262 instructs, about a handover to the macrocell, a terminal that is determined to be able to be connected to the macrocell on the basis of the measurement results (step S31).

<4. Configuration of Terminal>

Next, with reference to FIG. 14 to FIG. 17, the terminal apparatus 300 will be described. The terminal apparatus 300 is a dual mode terminal that can be operated with both the FDD scheme and the TDD scheme.

[4-1. Configuration Example of Apparatus]

Figure 14:
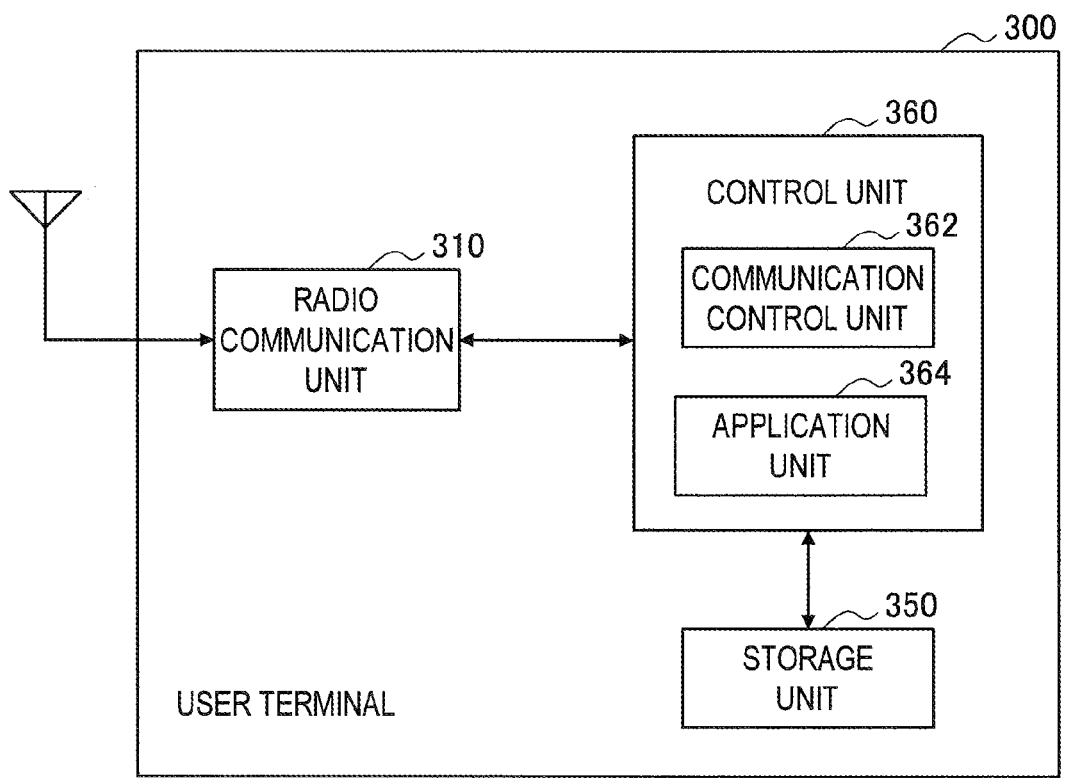
FIG. 14 is a block diagram showing an example of a configuration of a terminal apparatus according to an embodiment.

FIG. 14 is a block diagram showing an example of a configuration of the terminal apparatus 300 according to this embodiment. Referring to FIG. 14, the terminal apparatus 300 includes a radio communication unit 310, a storage unit 350, and a control unit 360.

(1) Radio Communication Unit

The radio communication unit 310 is a radio communication interface that is operated with the FDD scheme and the TDD scheme. The radio communication unit 310 can be connected to the macrocell in a case in which the small cell is not operated in the vicinity. While being connected to the macrocell, the radio communication unit 310 transmits and receives radio signals with the FDD scheme to/from the macrocell base station 100. Further, in a case in which the small cell is operated by the above described small cell base station 200 in the vicinity, the radio communication unit 310 can be connected to the small cell. While being connected to the small cell, the radio communication unit 310 transmits and receives radio signals with the TDD scheme to/from the small cell base station 200. The radio communication unit 310 can recognize the presence of the neighboring small cell in operation by searching for synchronization signals broadcasted from the small cell base station 200, for example.

Further, in this embodiment, the radio communication unit 310 may monitor the above described grant information that is broadcasted from the macrocell base station 100 on the downlink resource. The radio communication unit 310 can receive the grant information as a piece of the scheduling information or the system information on the downlink resource of the primary system, for example. The radio communication unit 310 descrambles the received grant information by using the identification information such as RNTI that is defined commonly for an apparatus that decodes the grant information, for example.

Figure 15:
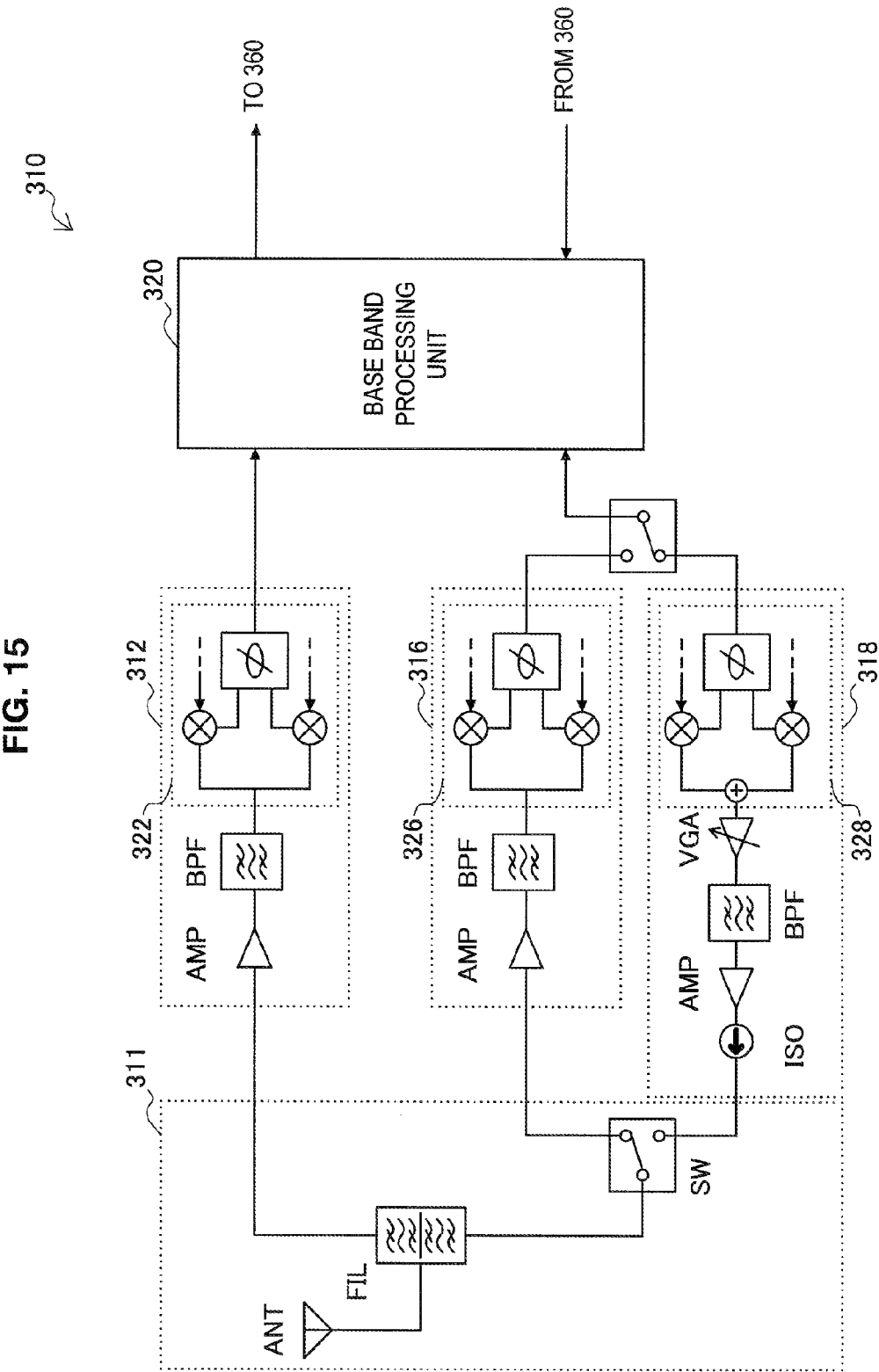
FIG. 15 is a block diagram showing an example of a detailed configuration of a radio communication unit shown in FIG. 14.

FIG. 15 is a block diagram showing an example of a detailed configuration of the radio communication unit 310 shown in FIG. 14. Referring to FIG. 15, the radio communication unit 310 includes an antenna section 311, a first reception section 312, a second reception section 316, a transmission section 318, and a base band processing unit 320.

The antenna section 311 includes a transmission and reception antenna (ANT), a filter (FIL), and an antenna switch (SW). Without limitation to the example shown in FIG. 15, the antenna section 311 may include more antennas.

Each of the first reception section 312 and the second reception section 316 includes a reception amplifier (AMP), a band-pass filter (BPF), and orthogonal demodulators 322 and 326. The orthogonal demodulators 322 and 326 each demodulate reception signals with a reception frequency adjusted by a frequency synthesizer (not shown).

The base band processing unit 320 decodes the reception signals demodulated by the first reception section 312 and the second reception section 316, and corrects errors thereof. Further, the base band processing unit 320 attempts to descramble the grant information received from the macrocell base station 100 by using the identification information that is defined in advance. Then, the base band processing unit 320 outputs, to the control unit 360, the grant information that has successfully performed descramble and decoding.

The transmission section 318 includes an orthogonal modulator 328, a variable gain amplifier (VGA), a band-pass filter (BPF), a transmission amplifier (AMP), and an isolator (ISO). The orthogonal modulator 328 modulates transmission signals that are encoded by the base band processing unit 320 with a transmission frequency that is adjusted by a frequency synthesizer (not shown).

For example, the first reception section 312 can be used to receive downlink signals from the macrocell base station 100. The second reception section 316 can be used to receive radio signals from the small cell base station 200. The transmission section 318 can be used to transmit uplink signals to the macrocell base station 100 or to transmit radio signals to the small cell base station 200. Some of these sections may be operated at the same time.

(2) Storage Unit

The storage unit 350 stores a program and data for operations of the terminal apparatus 300 by using a storage medium such as a hard disk or a semiconductor memory.

(3) Control Unit

The control unit 360 controls general operations of the terminal apparatus 300 by using a processor such as a CPU or a DSP. In this embodiment, the control unit 360 includes a communication control unit 362 and an application unit 364.

More specifically, the communication control unit 362 makes the frame timing of the radio communication unit 310 synchronize with the frame timing of the primary system or the secondary system in advance. Further, in accordance with the scheduling information received from the macrocell base station 100 or the small cell base station 200, the communication control unit 362 causes the radio communication unit 310 to transmit radio signals or causes the radio communication unit 310 to receive radio signals. Further, when the instruction of measurement is given from the macrocell base station 100 or the small cell base station 200, the communication control unit 362 performs measurement by using reference signals of the downlink and reports the measurement results indicating the measured communication quality. Furthermore, when an instruction of a handover is given, the communication control unit 362 changes a connection destination from the base station that is being connected at that time (source base station) to another base station (target base station).

Further, in this embodiment, the communication control unit 362 causes the radio communication unit 310 to monitor the grant information to be broadcasted from the macrocell base station 100 on the downlink resource, while being connected to the macrocell. Then, when the grant information is received by the radio communication unit 310, the communication control unit 362 searches for the secondary system that is operated on the resource for secondary use during the period that is associated with the grant information (for example, the communication control unit 362 attempts to receive synchronization signals broadcasted from the small cell base station 200). In this manner, by monitoring the grant information, the terminal apparatus 300 can detect the secondary system at a timing at which the operation of the secondary system is predicted to be started, and can change the connection destination to the secondary system (that is, a handover is performed) without searching for the secondary system continuously. Accordingly, the terminal apparatus 300 can receive higher communication quality.

The application unit 364 implements applications of an upper layer. The application unit 364 generates data traffic to be transmitted to another apparatus and outputs the generated data traffic to the radio communication unit 310. Further, the application unit 364 processes data traffic received by the radio communication unit 310 from another apparatus. The application implemented by the application unit 364 may be application having any purpose, such as reproduction of content, social networking, navigation, or Internet browsing.

[4-2. Example of Flow of Processing]

Figure 16:
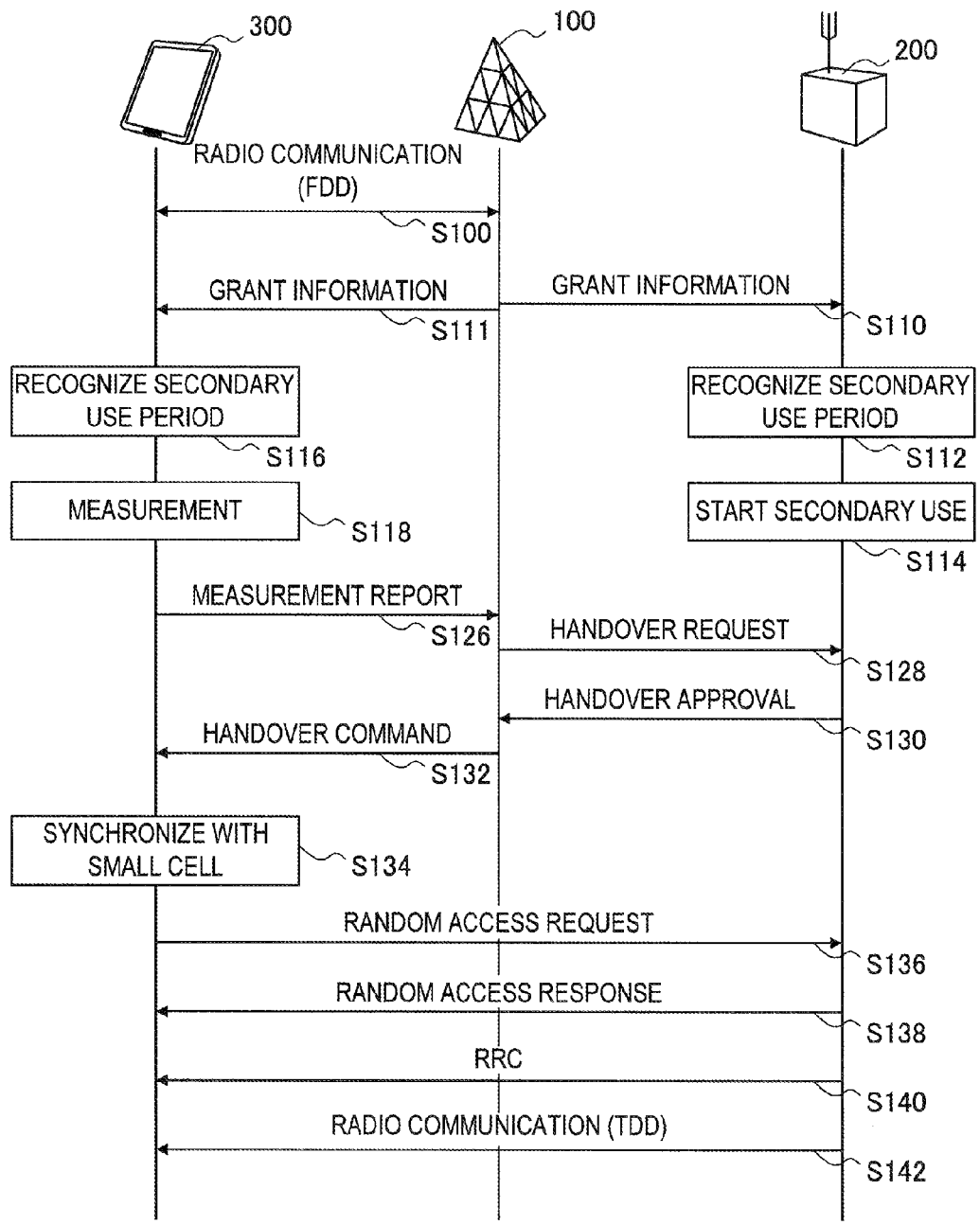
FIG. 16 is a sequence diagram showing an example of a flow of communication control processing when a secondary use period starts.

FIG. 16 is a sequence diagram showing an example of a flow of communication control processing when a secondary use period starts.

Referring to FIG. 16, first, the terminal apparatus 300 is connected to the macrocell base station 100, and performs radio communication with the FDD scheme with the macrocell base station 100 (step S100). After that, when the grant information is broadcasted from the macrocell base station 100, the small cell base station 200 receives the broadcasted grant information (step S110). The terminal apparatus 300 also receives the grant information (step S111).

The small cell base station 200 recognizes the resource for secondary use specified by the received grant information and the secondary use period (step S112). Then, when the secondary use period arrives, the small cell base station 200 starts operating the secondary system on the resource for secondary use (step S114).

Meanwhile, the terminal apparatus 300 also recognizes the resource for secondary use specified by the grant information received in the step S111 and the secondary use period (step S116). Then, when the secondary use period arrives, the terminal apparatus 300 performs measurement on the resource for secondary use (step S118), and reports the measurement results to the macrocell base station 100 (step S126).

In a case in which it is indicated that the communication quality of the secondary system is excellent in the measurement results in the terminal apparatus 300, the macrocell base station 100 requests the small cell base station 200 to perform a handover of the terminal apparatus 300 to the secondary system (step S128). Then, when the request is approved by the small cell base station 200 (step S130), the macrocell base station 100 transmits a handover command to the terminal apparatus 300 (step S132).

When the handover command is received from the macrocell base station 100, the terminal apparatus 300 acquires synchronization with the small cell (step S134), and transmits a random access request to the small cell base station 200 (step S136). Then, after a random access response is received (step S138), the terminal apparatus 300 performs a procedure of radio resource control (RRC) (step S140), and then performs radio communication with the small cell base station 200 with the TDD scheme (step S142).

FIG. 17 is a sequence diagram showing an example of a flow of communication control processing when the secondary use period ends.

Referring to FIG. 17, first, the small cell base station 200 receives the grant information from the macrocell base station 100 (step S150), and operates the secondary system. The terminal apparatus 300 is connected to the small cell base station 200, and performs radio communication with the small cell base station 200 with the TDD scheme (step S160).

After that, the small cell base station 200 determines that the end of the secondary use period is approaching (step S170), and transmits a measurement request to the terminal apparatus 300 that is being connected to the small cell base station 200 (step 172).

When the measurement request is received, the terminal apparatus 300 performs measurement on the frequency resource that is assigned to the primary system (step S174), and reports the measurement results to the small cell base station 200 (step S176).

In a case in which the communication quality of the primary system is not poor in the measurement results in the terminal apparatus 300, the small cell base station 200 requests, to the macrocell base station 100, a handover of the terminal apparatus 300 to the primary system (step S178). Then, when the request is approved by the macrocell base station 100 (step S180), the small cell base station 200 transmits a handover command to the terminal apparatus 300 (step S182).

When the handover command is received from the small cell base station 200, the terminal apparatus 300 acquires synchronization with the macrocell (step S184), and transmits a random access request to the macrocell base station 100 (step S186). Then, after a random access response is received (step S188), the terminal apparatus 300 performs a procedure of radio resource control (RRC) (step S190), and then performs radio communication with the macrocell base station 100 with the FDD scheme (step S192).

After that, when the secondary use is granted again, the terminal apparatus 300 can dynamically change the connection to the small cell base station 200 in accordance with the flow of processing shown in FIG. 16.

<5. Conclusion>

The embodiments of the technique according to the present disclosure have been described above in detail with reference to FIG. 1 to FIG. 17. According to the above described embodiments, the grant information that specifies the resource for secondary use within a frequency resource assigned to the primary system operated with the FDD scheme is provided from the primary system to the secondary system. The grant information is associated with the period during which the secondary use is granted. Then, during the period associated with the grant information, the secondary system is operated on the resource for secondary use with the TDD scheme. Accordingly, in a recent radio communication environment in which the traffic amount always changes, by releasing dynamically the frequency resource to the secondary system, the usage efficiency of the frequency resource can be improved.

Further, according to the above described embodiments, the resource for secondary use is included in the uplink resource of the primary system. Accordingly, interference from the secondary system can be controlled more easily on the macrocell side than in a case in which the downlink resource is secondarily used. Further, the resource for secondary use is specified in a unit of a component carrier. Accordingly, by utilizing the mechanism of communication control for each component carrier of the base station of the LTE-A scheme, it becomes possible to achieve dynamic control such as setting and release of the secondary use period at a low cost.

Further, according to the above described embodiments, the grant information is broadcasted as a piece of the scheduling information or the system information on the downlink resource of the primary system. The scheduling information and the system information is normally information that is monitored any time by the terminal apparatus. Accordingly, according to this configuration, it becomes possible to provide the grant information to the small cell base station and the terminal apparatus in real time without additionally providing a channel dedicated to the control of the secondary use. Further, the grant information is scrambled by using the identification information that is defined commonly for the apparatus that is to secondarily use the frequency resource. Accordingly, it becomes possible to provide the grant information by using the existing frame of signaling of the scheduling information.

Further, according to the above described embodiments, the frame timing of the secondary system is synchronized with that of the primary system and an uplink-downlink configuration that is common to a plurality of secondary systems is set. Accordingly, it becomes possible to reduce a risk of generating harmful interference between the plurality of secondary systems.

Further, according to the above described embodiments, before the secondary use period associated with the grant information ends, an instruction of a handover to the primary system is given by the terminal that is being connected to the secondary system. Accordingly, it becomes possible to end the secondary use that is granted temporarily without damaging the continuity of a communication session of the terminal that is being connected to the secondary system as much as possible.

Further, according to the above described embodiments, a resource that is determined to have a lower risk of giving interference to the adjacent cell is decided as the resource for secondary use, on the basis of the indicator for inter-cell interference coordination notified between cells of the primary system. Accordingly, it becomes possible to decide the resource for secondary use in a manner that the risk of interference accompanied by the dynamic secondary use of the frequency resource can be minimized.

Further, according to the above described embodiments, the terminal apparatus also receives the grant information, and the terminal apparatus searches for the secondary system on the resource for secondary use in the period associated with the grant information. Accordingly, without searching for the secondary system continuously, at a timing at which the operation of the secondary system is predicted to be started, the terminal apparatus can change the connection destination to the secondary system properly and can receive excellent communication quality.

Note that a series of control processing by each apparatus described in this specification may be achieved by using any of software, hardware, and a combination of software and hardware. A program constituting software is stored in a storage medium in advance, the medium being provided in the inside or outside of each apparatus, for example. When each program is executed, for example, the program is read by random access memory (RAM) and executed by a processor such as a CPU.

The preferred embodiments of the present disclosure have been described above in detail with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A communication control apparatus including:

a communication unit configured to receive, from a base station of a first radio communication system, grant information that specifies a resource for secondary use within a frequency resource assigned to the first radio communication system operated with a frequency division duplex scheme; and a communication control unit configured to operate a second radio communication system with a time division duplex scheme on the resource for secondary use during a period that is associated with the grant information.

(2)

The communication control apparatus according to (1), wherein the resource for secondary use is included in an uplink resource of the first radio communication system.

(3)

The communication control apparatus according to (1) or (2), wherein the first radio communication system is a system operated by using a plurality of component carriers, and wherein the grant information specifies the resource for secondary use in a unit of a component carrier.

(4)

The communication control apparatus according to any one of (1) to (3), wherein the communication unit receives the grant information as a piece of scheduling information or system information on a downlink resource of the first radio communication system.

(5)

The communication control apparatus according to any one of (1) to (4), wherein the communication unit descrambles the grant information by using identification information defined commonly for an apparatus that decodes the grant information.

(6)

The communication control apparatus according to any one of (1) to (5), wherein the communication control unit makes a frame timing of the second radio communication system synchronize with a frame timing of the first radio communication system.

(7)

The communication control apparatus according to (6), wherein the communication control unit sets, in the second radio communication system, an uplink-downlink configuration that is common to a plurality of systems using the resource for secondary use.

(8)

The communication control apparatus according to (7), wherein the communication control unit notifies a third radio communication system using the resource for secondary use about information on the uplink-downlink configuration of the second radio communication system.

(9)

The communication control apparatus according to any one of (6) to (8), wherein the communication control unit notifies a third radio communication system using the resource for secondary use about scheduling information related to a cell edge terminal of the second radio communication system.

(10)

The communication control apparatus according to any one of (1) to (9), wherein, before the period that is associated with the grant information ends, the communication control unit gives an instruction of a handover to the first radio communication system by a terminal that is being connected to the second radio communication system.

(11)

A communication control apparatus including:

a communication control unit configured to operate, on a frequency resource assigned to a first radio communication system, the first radio communication system with a frequency division duplex scheme;

a secondary use control unit configured to decide a resource for secondary use within the frequency resource, and to generate grant information that is associated with a period during which secondary use is granted; and a communication unit configured to transmit the generated grant information.

(12)

The communication control apparatus according to (11), wherein the resource for secondary use is included in an uplink resource of the first radio communication system.

(13)

The communication control apparatus according to (11) or (12), wherein the communication control unit operates the first radio communication system by using a plurality of component carriers, and wherein the secondary use control unit decides the resource for secondary use in a unit of a component carrier.

(14)

The communication control apparatus according to any one of (11) to (13), wherein the communication unit broadcasts the grant information as a piece of scheduling information or system information on a downlink resource.

(15)

The communication control apparatus according to any one of (11) to (14), wherein the secondary use control unit decides, as the resource for secondary use, a resource that is determined to have a lower risk of giving interference to an adjacent cell on the basis of an indicator for inter-cell interference coordination notified among cells of the first radio communication system.

(16)

The communication control apparatus according to (15), wherein the indicator includes at least one of a relative narrow band TX power indicator (RNTPI), a high interference indicator (HII), and an overload indicator (OI).

(17)

The communication control apparatus according to any one of (11) to (16), wherein the secondary use control unit notifies a base station of a second cell about an indicator for inter-cell interference coordination in a manner that, in the resource for secondary use that is granted for a first cell, interference with the second cell adjacent to the first cell is suppressed.

(18)

The communication control apparatus according to any one of (11) to (17), wherein the communication unit scrambles the grant information by using identification information defined commonly for an apparatus that decodes the grant information.

(19)

A terminal apparatus including:

a communication unit configured to receive, from a base station of a first radio communication system, grant information that specifies a resource for secondary use within a frequency resource assigned to the first radio communication system operated with a frequency division duplex scheme; and a communication control unit configured to search for a second radio communication system operated with a time division duplex scheme on the resource for secondary use during a period that is associated with the grant information.

(20)

A communication control method including:

deciding, in a first communication control apparatus that operates a first radio communication system with a frequency division duplex scheme on a frequency resource assigned to the first radio communication system, a resource for secondary use within the frequency resource;

transmitting grant information that specifies the decided resource for secondary use from the first communication control apparatus to a second communication control apparatus; and operating, by the second communication control apparatus, a second radio communication system with a time division duplex scheme on the resource for secondary use during a period that is associated with the grant information.

REFERENCE SIGNS LIST 1 communication control system
100 communication control apparatus (macrocell base station)
110 radio communication unit
162 communication control unit
164 secondary use control unit
200 communication control apparatus (small cell base station)
210 radio communication unit
262 communication control unit
300 terminal apparatus
310 radio communication unit
362 communication control unit

The invention claimed is:

1. A communication control apparatus comprising circuitry configured to operate as:
a communication unit configured to receive, from a base station of a first radio communication system, grant information that specifies a resource for secondary use within a frequency resource assigned to the first radio communication system operated with a frequency division duplex scheme and that identifies a period for which the secondary use of the resource is granted; and
a communication control unit configured to operate a second radio communication system with a time division duplex scheme on the resource for secondary use during the period that is identified by the grant information, and to notify a third radio communication system using the resource for secondary use about scheduling information related to a cell edge terminal of the second radio communication system.

2. The communication control apparatus according to claim 1,
wherein the resource for secondary use is included in an uplink resource of the first radio communication system.

3. The communication control apparatus according to claim 1,
wherein the first radio communication system is a system operated by using a plurality of component carriers, and
wherein the grant information specifies the resource for secondary use in a unit of a component carrier.

4. The communication control apparatus according to claim 1,
wherein the communication unit receives the grant information as a piece of scheduling information or system information on a downlink resource of the first radio communication system.

5. The communication control apparatus according to claim 1,
wherein the communication unit descrambles the grant information by using identification information defined commonly for an apparatus that decodes the grant information.

6. The communication control apparatus according to claim 1,
wherein the communication control unit makes a frame timing of the second radio communication system synchronize with a frame timing of the first radio communication system.

7. The communication control apparatus according to claim 6,
wherein the communication control unit sets, in the second radio communication system, an uplink-downlink configuration that is common to a plurality of systems using the resource for secondary use.

8. The communication control apparatus according to claim 7,
wherein the communication control unit notifies a third radio communication system using the resource for secondary use about information on the uplink-downlink configuration of the second radio communication system.

9. The communication control apparatus according to claim 1,
wherein, before the period that is associated with the grant information ends, the communication control unit gives an instruction of a handover to the first radio communication system by a terminal that is being connected to the second radio communication system.

10. A communication control method comprising:
deciding, in a first communication control apparatus that operates a first radio communication system with a frequency division duplex scheme on a frequency resource assigned to the first radio communication system, a resource for secondary use within the frequency resource;
transmitting grant information that specifies the decided resource for secondary use and that identifies a period for which the secondary use of the resource is granted from the first communication control apparatus to a second communication control apparatus;
operating, by the second communication control apparatus, a second radio communication system with a time division duplex scheme on the resource for secondary use during the period that is identified by the grant information; and
notifying a third radio communication system using the resource for secondary use about scheduling information related to a cell edge terminal of the second radio communication system.

\* \* \* \* \*